United States Patent
Reed et al.

(10) Patent No.: US 12,525,365 B2
(45) Date of Patent: Jan. 13, 2026

(54) NUCLEAR REACTOR CORE HAVING OUTER PORTION COOLANT PASSAGES OF LARGER DIAMETER THAN INNER PORTION COOLANT PASSAGES

(71) Applicant: Standard Nuclear, Inc., New York, NY (US)

(72) Inventors: Mark Reed, Seattle, WA (US); Michael John Eades, Seattle, WA (US); Paolo Francesco Venneri, Seattle, WA (US); Vishal Patel, Seattle, WA (US); Wesley Deason, Seattle, WA (US); Richard J. Kapernick, Seattle, WA (US)

(73) Assignee: Standard Nuclear, Inc., New York, NY (US)

( * ) Notice: Subject to any disclaimer, the term of this patent is extended or adjusted under 35 U.S.C. 154(b) by 198 days.

(21) Appl. No.: 17/785,313

(22) PCT Filed: Jan. 25, 2021

(86) PCT No.: PCT/US2021/014858
§ 371 (c)(1),
(2) Date: Jun. 14, 2022

(87) PCT Pub. No.: WO2021/151055
PCT Pub. Date: Jul. 29, 2021

(65) Prior Publication Data
US 2023/0024338 A1    Jan. 26, 2023

Related U.S. Application Data

(60) Provisional application No. 62/965,829, filed on Jan. 25, 2020.

(51) Int. Cl.
G21C 5/14    (2006.01)
G21C 5/02    (2006.01)
G21C 15/08    (2006.01)

(52) U.S. Cl.
CPC ............ G21C 5/14 (2013.01); G21C 5/02 (2013.01); G21C 15/08 (2013.01)

(58) Field of Classification Search
CPC ............ G21C 5/14; G21C 5/02; G21C 15/08
(Continued)

(56) References Cited

U.S. PATENT DOCUMENTS 3,264,191 A * 8/1966 Huntington ............... G21C 7/26
                                                        376/458
3,413,196 A * 11/1968 Fortescue ................ G21C 3/04
                                                        376/427

(Continued)

FOREIGN PATENT DOCUMENTS

GB        1253358        * 11/1971 ............... G21C 5/14

OTHER PUBLICATIONS

Notice of Reasons for Refusal in Japanese Patent Application 2022-539362, dated Aug. 2024. (Year: 2024).*

(Continued)

*Primary Examiner* — Jack W Keith
*Assistant Examiner* — Daniel Wasil
(74) *Attorney, Agent, or Firm* — Sikand IP Law PLLC

(57) ABSTRACT

A nuclear reactor core includes a plurality of fuel elements and moderator blocks to form a nuclear reactor core inner portion and a nuclear reactor core outer portion. The nuclear reactor core inner portion includes an inner moderator matrix formed of a plurality of inner holes that include a plurality of inner fuel openings with one or more fuel elements disposed therein. The plurality of inner holes further include a plurality of inner coolant passages to flow a coolant. The nuclear reactor core outer portion includes an outer moderator matrix formed of a plurality of outer holes that include a plurality of outer fuel openings with one or more fuel elements disposed therein. The plurality of outer (Continued)

holes further include a plurality of outer coolant passages to flow the coolant. The outer coolant passage diameter exceeds the inner coolant passage diameter.

6 Claims, 24 Drawing Sheets

(58) Field of Classification Search
USPC .................................................. 376/427, 459
See application file for complete search history.

(56) References Cited

U.S. PATENT DOCUMENTS

| | | | |
|---|---|---|---|
| 9,299,464 B2 | 3/2016 | Venneri et al. | |
| 9,620,248 B2 | 4/2017 | Venneri | |
| 10,032,528 B2 | 7/2018 | Venneri | |
| 10,109,378 B2 | 10/2018 | Snead | |
| 10,475,543 B2 | 11/2019 | Venneri | |
| 10,573,416 B2 | 2/2020 | Venneri | |
| 10,643,754 B2 | 5/2020 | Venneri et al. | |
| 2015/0310941 A1 | 10/2015 | Koch et al. | |
| 2016/0035441 A1 | 2/2016 | Totemeier et al. | |
| 2016/0189804 A1 | 6/2016 | Shayer | |
| 2018/0033501 A1* | 2/2018 | Kimura | G21C 3/22 |
| 2020/0027585 A1* | 1/2020 | Russell | G21C 5/02 |
| 2020/0027587 A1 | 1/2020 | Venneri | |
| 2021/0174976 A1* | 6/2021 | Claudio | G21C 5/02 |
| 2022/0301732 A1* | 9/2022 | Venneri | G21C 11/06 |

OTHER PUBLICATIONS

International Preliminary Report on Patentability for International Application No. PCT/US2021/014858, dated Jul. 26, 2022, 5 pages.
International Search Report and Written Opinion for International Application No. PCT/US2021/014858, dated Jun. 14, 2021, 11 pages.
Extended European Search Report for European Application No. 21744498.3, dated Feb. 5, 2024, 11 pages.
Partial Supplementary European Search Report for Application No. 21744498.3, dated Nov. 15, 2023, 12 pages.

* cited by examiner

NUCLEAR REACTOR CORE HAVING OUTER PORTION COOLANT PASSAGES OF LARGER DIAMETER THAN INNER PORTION COOLANT PASSAGES

CROSS-REFERENCE TO RELATED APPLICATIONS

This application is a U.S. National Phase Patent Application of International Application No. PCT/US2021/014858, filed Jan. 25, 2021, the entirety of which is incorporated by reference herein. International Application No. PCT/US2021/014858 claims priority to U.S. Provisional Patent Application No. 62/965,829, filed on Jan. 25, 2020, titled "Skewed-Pin (SPin) Moderator Blocks for Nuclear Fission Reactors," the entirety of which is incorporated by reference herein.

TECHNICAL FIELD

The present subject matter relates to examples of nuclear reactor systems and nuclear reactors for power production and propulsion, e.g., in remote regions, such as outer space. The present subject matter also encompasses a nuclear reactor core architecture that includes a skewed-pin moderator block array.

BACKGROUND

A nuclear reactor core is the part of a nuclear reactor where nuclear fission reactions occur and heat is generated. Power peaking factor is a highest local power density at a hottest portion of the nuclear reactor core, divided by an average power density of the nuclear reactor core. The hottest portion of the nuclear reactor core is co-located with the highest local power density. The temperature difference between the hottest portion of the nuclear reactor core and the average of the nuclear reactor core is proportional to the power peaking factor. Because the average power density of the nuclear reactor core is limited by the ability of a nuclear reactor core material in the hottest portion of the nuclear reactor core with the highest local power density, a high power peaking factor is a barrier to performance and reliability of the nuclear reactor core.

Generally described, nuclear fission reactors include thermal or fast type nuclear reactors. Nuclear fission reactors include nuclear fuel inside the nuclear reactor core and a moderator to slow down fast neutrons so that nuclear fission can continue. Typically, the nuclear fuel is formed in cylindrical shaped fuel compacts or pellets. The fuel compacts are loaded into fuel pins or rods, cladded, and stacked inside the numerous columns of fuel elements in the nuclear reactor core. These fuel elements are then slotted into moderator blocks.

In the nuclear reactor core, the moderator blocks are typically formed of solid neutron moderator materials, such as graphite, beryllium, beryllium oxide, beryllides, or hydrides, and contain regularly spaced cylindrical holes. The regularly spaced cylindrical holes include fuel openings that contain the nuclear fuel and coolant passages that flow a coolant. Unfortunately, the regularly spaced holes increase the power peaking factor within the nuclear reactor core, often near the radial center of the nuclear reactor core.

A high power peaking factor restricts performance and reliability of the nuclear reactor core. Exceeding an upper temperature limit that the nuclear reactor core material is designed for can cause a safety or reliability issue with the nuclear reactor that requires shutdown. Therefore, care is taken to ensure that no part of the nuclear reactor core exceeds the upper temperature limit, which unfortunately diminishes performance. On the other hand, a low power peaking factor allows for improved performance of the nuclear reactor core. For example, if the highest local power density is reduced, then the total nuclear reactor core power of the nuclear reactor can be increased due to more uniformity in the temperatures of various regions of the nuclear reactor core. Moreover, reducing the power peaking factor of the nuclear reactor core enables the nuclear reactor to be more compact (e.g., smaller), lighter (e.g., reduced mass), and more reliable by operating at a more predictable power level. Having a more compact, lighter, and more reliable nuclear reactor core enables a nuclear system with a higher power per unit mass, which can enable successful implementation of future exploration and settlement of outer space by reducing payload.

In nuclear fission reactors, such as high-temperature gas reactors (HTGRs), all of the fuel openings that contain the nuclear fuel typically have the same diameter. Likewise, the coolant passages that flow the coolant typically have the same diameter. Unfortunately, the lack of variation of diameter among the coolant passages exacerbates the high power peaking factor. If an averaged coolant passage diameter of the coolant passages is too narrow near the center of the nuclear reactor core, then a larger volume of coolant is prevented from flowing through the hottest part of the nuclear reactor core, which increases the power peaking factor. Additionally, if the averaged coolant passage diameter is too wide near the edge of the reactor core, then the nuclear fuel in the nearby fuel openings is cooled too much, reducing overall efficiency.

Moreover, the coolant passages that do exist near the radial center of the nuclear reactor core are the hottest, which places the coolant channel power peaking location at the radial center of the nuclear reactor core, in the same location as nuclear fuel power peaking location. This co-locating of the coolant channel power peaking location and the nuclear fuel power peaking location makes the radial center of the nuclear reactor core the hottest portion of the nuclear reactor core, and consequently the most likely point of failure. Accordingly, improvements to moderator blocks for the nuclear reactor core are needed.

SUMMARY

The various examples disclosed herein relate to nuclear reactor core technologies for nuclear reactor systems both for space or terrestrial (e.g., land or water) applications. To reduce the power peaking factor, a nuclear reactor core 101 includes a "skewed pin" (SPin) moderator block array of SPin moderator blocks with a geometry, such that a ratio of moderator volume to fuel volume increases toward a radial center of the nuclear reactor core and decreases towards a periphery portion of the nuclear reactor core. The SPin moderator blocks flatten the radial power profile of any nuclear reactor core 101 with a solid moderator. This reduces the nuclear fuel pin power peaking factor and the coolant channel power peaking factor, which reduces peak core temperatures at a given power. Therefore, if a certain nuclear reactor core material has a fixed maximum temperature limit, the total nuclear reactor core power can be increased. Alternatively, the nuclear reactor core can be redesigned to be smaller (or less massive) at a fixed power. This is particularly advantageous for space reactors, such as nuclear thermal propulsion (NTP) reactors, for which total mass is a key performance metric. However, the SPin moderator block array technology can be utilized in terrestrial application, such as in a HTGR.

Skewed-pin moderator block array 113 implements several advantageous technologies. First, a hole spacing and moderator "web thickness" that is smaller near the nuclear reactor core radial center 156 and larger near the nuclear reactor core radial periphery 157, resulting in a "skewed-pin" geometry. Second, a hole diameter of the inner coolant passages 141A-M or the inner fuel openings 131A-M that is smaller near the nuclear reactor core radial center 156, and a hole diameter of the outer coolant passages 142A-M or the outer fuel openings 132A0N are larger near the nuclear reactor core radial core periphery 157. Both the hole spacing and hole diameter implemented reduce the power peaking factor in the nuclear reactor core 101.

An example nuclear reactor core 101 includes a plurality of fuel elements 150A-N and a skewed-pin moderator block array 113 of skewed-pin moderator blocks 103A-N, which form a nuclear reactor core inner portion 123A and a nuclear reactor core outer portion 123B. The nuclear reactor core inner portion 123A includes an inner moderator matrix 121A formed of a plurality of inner holes 161A-Z that include a plurality of inner fuel openings 131A-M with one or more fuel elements 150A-N disposed therein. The plurality of inner holes 161A-Z further include a plurality of inner coolant passages 141A-M to flow a coolant. The nuclear reactor core outer portion 123B includes an outer moderator matrix 121B formed of a plurality of outer holes 162A-Z that include a plurality of outer fuel openings 132A-M with one or more fuel elements 150A-N disposed therein. The plurality of outer holes 162A-Z further include a plurality of outer coolant passages 142A-M to flow the coolant. The inner holes 161A-Z of the inner moderator matrix 121A are irregularly spaced with respect to the outer holes 162A-Z of the outer moderator matrix 121B.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accordance with the present concepts, by way of example only, not by way of limitations. In the figures, like reference numerals refer to the same or similar elements.

Figure 1A:
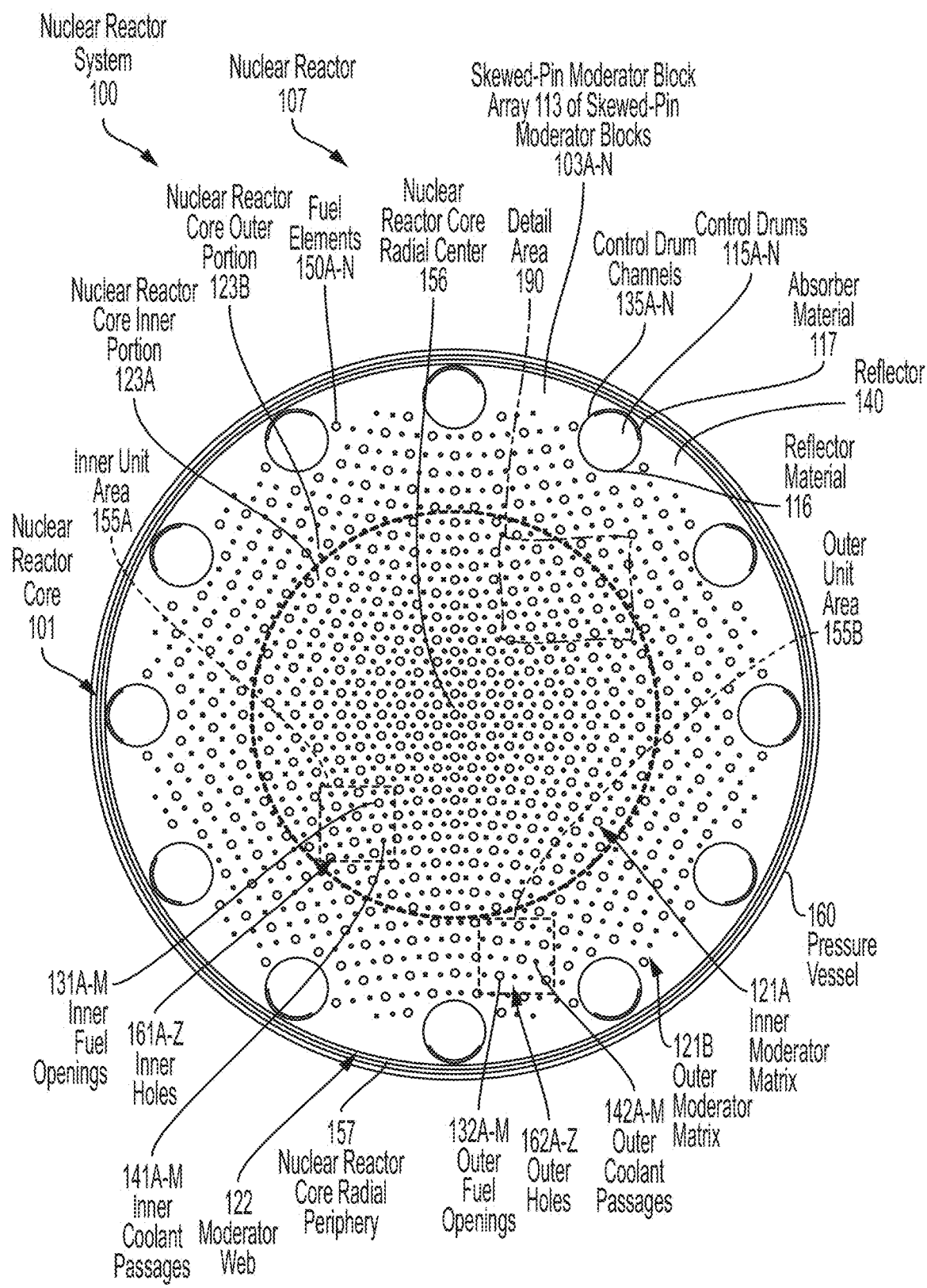
FIG. 1A is a cross-sectional view of a nuclear reactor core with a skewed-pin moderator block array, including a plurality of fuel openings with a fixed diameter and a plurality of coolant passages with a fixed diameter.

| Parts Listing | |
|---|---|
| 100 | Nuclear Reactor System |
| 101 | Nuclear Reactor Core |
| 103A-N | Skewed-Pin Moderator Blocks |
| 103O | Center Skewed-Pin Moderator Block |
| 103P-U | Outer Skewed-Pin Moderator Blocks |
| 107 | Nuclear Reactor |
| 113 | Skewed-Pin Moderator Block Array |
| 115A-N | Control Drums |
| 116 | Reflector Material |
| 117 | Absorber Material |
| 121A | Inner Moderator Matrix |
| 121B | Outer Moderator Matrix |
| 122 | Moderator Web |
| 123A | Nuclear Reactor Core Inner Portion |
| 123B | Nuclear Reactor Core Outer Portion |
| 131A-M | Inner Fuel Openings |
| 132A-M | Outer Fuel Openings |
| 135 A-N | Control Drum Channels 135A-N |
| 140 | Reflector |
| 141A-M | Inner Coolant Passages |
| 142A-M | Outer Coolant Passages |
| 150A-N | Fuel Elements |
| 155A | Inner Unit Area |

-continued

| Parts Listing | |
|---|---|
| 155B | Outer Unit Area |
| 156 | Nuclear Reactor Core Radial Center |
| 157 | Nuclear Reactor Core Radial Periphery |
| 160 | Pressure Vessel |
| 161A-Z | Inner Holes |
| 162A-Z | Outer Holes |
| 190 | Detail Area |
| 231A-M | Inner Fuel Openings |
| 232A-M | Outer Fuel Openings |
| 233 | Inner Fuel Opening Size |
| 234 | Outer Fuel Opening Size |
| 241A-M | Inner Coolant Passages |
| 242A-M | Outer Coolant Passages |
| 243 | Inner Coolant Passage Size |
| 244 | Outer Coolant Passage Size |
| 290 | Detail Area |
| 261A-Z | Inner Holes |
| 262A-Z | Outer Holes |
| 381A-F | Center Moderator Interface Walls |
| 390 | Detail Area |
| 391A-C | Outer Moderator Interface Walls |
| 400A | Ring One Power Peaking Performance Plot |
| 400B | Ring Two Power Peaking Performance Plot |
| 400C | Ring Three Power Peaking Performance Plot |
| 400D | Ring Four Power Peaking Performance Plot |
| 401A-Z | Design Data Point |
| 402A-Z | Design Data Point |
| 403A-Z | Design Data Point |
| 404A-Z | Design Data Point |
| 405 | Power Peaking Factor |
| 406A-Z | Design Data Point |
| 407A-Z | Design Data Point |
| 410 | K-Effective Ratio |
| 415 | Fuel Element Spacing Variation Factor |
| 420A-D | Pareto Frontier for -0.15 Spacing |
| 425A-D | Pareto Frontier for -0.1 Spacing |
| 430A-D | Pareto Frontier for 0.0 Spacing |
| 435A-D | Pareto Frontier for 0.1 Spacing |
| 440A-D | Pareto Frontier for 0.15 Spacing |
| 450 | Outer Diameter Power Peaking Performance Plot |
| 455 | Pareto Frontier for 95.0 Diameter |
| 460 | Pareto Frontier for 99.0 Diameter |
| 465 | Pareto Frontier for 103.0 Diameter |
| 466 | Minimum Fuel Element Distance Power Peaking Performance Plot |
| 470 | Fuel Element Minimum Distance |
| 475 | Pareto Frontier for 7.225 Spacing |
| 480 | Pareto Frontier for 7.65 Spacing |
| 485 | Pareto Frontier for 8.5 Spacing |
| 490 | Pareto Frontier for 9.35 Spacing |
| 495 | Pareto Frontier for 9.775 Spacing |
| 500A-D | Nuclear Reactor Core Heat Generation Map |
| 505 | Normalized Radial Assembly Power |
| 510 | Circular Ring Through Line |
| 515 | Hexagonal Ring Through Line |
| 525 | Ring One |
| 530 | Ring Two |
| 535 | Ring Three |
| 540 | Ring Four |

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The term "coupled" as used herein refers to any logical or physical connection. Unless described otherwise, coupled elements or devices are not necessarily directly connected to one another and may be separated by intermediate components, elements, etc.

Unless otherwise stated, any and all measurements, values, ratings, positions, magnitudes, sizes, angles, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±5% or as much as ±10% from the stated amount. The term "approximately" or "substantially" means that the parameter value or the like varies up to ±10% from the stated amount.

The orientations of the nuclear reactor core 101, nuclear reactor 107, associated components, and/or any nuclear reactor system 100 incorporating the skewed-pin moderator block array 113 and skewed-pin moderator blocks 103A-N, such as shown in any of the drawings, are given by way of example only, for illustration and discussion purposes. In operation for a particular nuclear reactor core 101, the nuclear reactor may be oriented in any other direction suitable to the particular application of the nuclear reactor, for example upright, sideways, or any other orientation. Also, to the extent used herein, any directional term, such as lateral, longitudinal, up, down, upper, lower, top, bottom, and side, are used by way of example only, and are not limiting as to direction or orientation of any nuclear reactor core 101 or component of the nuclear reactor core 101 constructed as otherwise described herein.

Although A is the first letter of the alphabet and Z is the twenty-sixth letter of the alphabet, due to the restriction of the alphabet, the designation "A-M," "A-N," and "A-Z" when following a reference number, such as 103, 131, 132, 141, 142, 161, 162, etc. can refer to more than twenty-six of those identical elements. Reference now is made in detail to the examples illustrated in the accompanying drawings and discussed below.

FIG. 1A is a cross-sectional view of a nuclear reactor core 101 of a nuclear reactor system 100. Nuclear reactor system 100 includes a nuclear reactor 107. The nuclear reactor 107 includes the nuclear reactor core 101, in which a controlled nuclear chain reaction occurs, and energy is released. The neutron chain reaction in the nuclear reactor core 101 is critical—a single neutron from each fission nucleus results in fission of another nucleus—the chain reaction must be controlled.

To reduce the power peaking factor, the nuclear reactor core 101 includes a skewed-pin moderator block array 113. As shown, the skewed-pin moderator block array 113 reduces the power peaking factor of the nuclear reactor core 101 by having irregularly spaced inner holes 161A-Z and outer holes 162A-Z. In FIGS. 1A-C and 2A-D, the skewed-pin moderator block array 113 is depicted as a monolithic, whole core, skewed-pin moderator block 103A. However, as shown in FIGS. 3A-E, the skewed-pin moderator block array 113 can include a plurality of skewed-pin moderator blocks 103A-N.

Figure 2A:
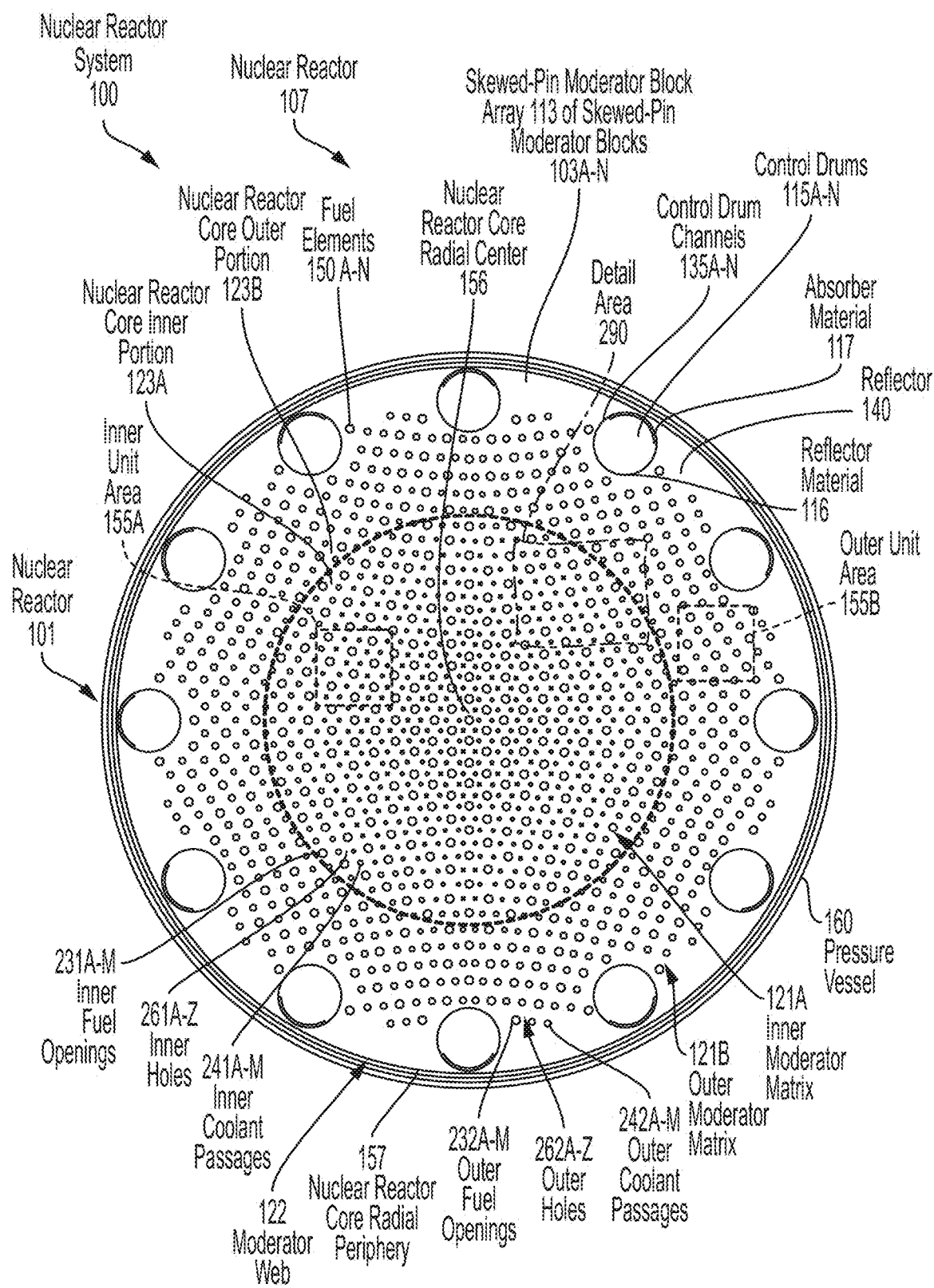
FIG. 2A is a cross-sectional view of a nuclear reactor core with a skewed-pin moderator block array, including a plurality of fuel openings with a fixed diameter and a plurality of coolant passages with a variable diameter.
Figure 2B:
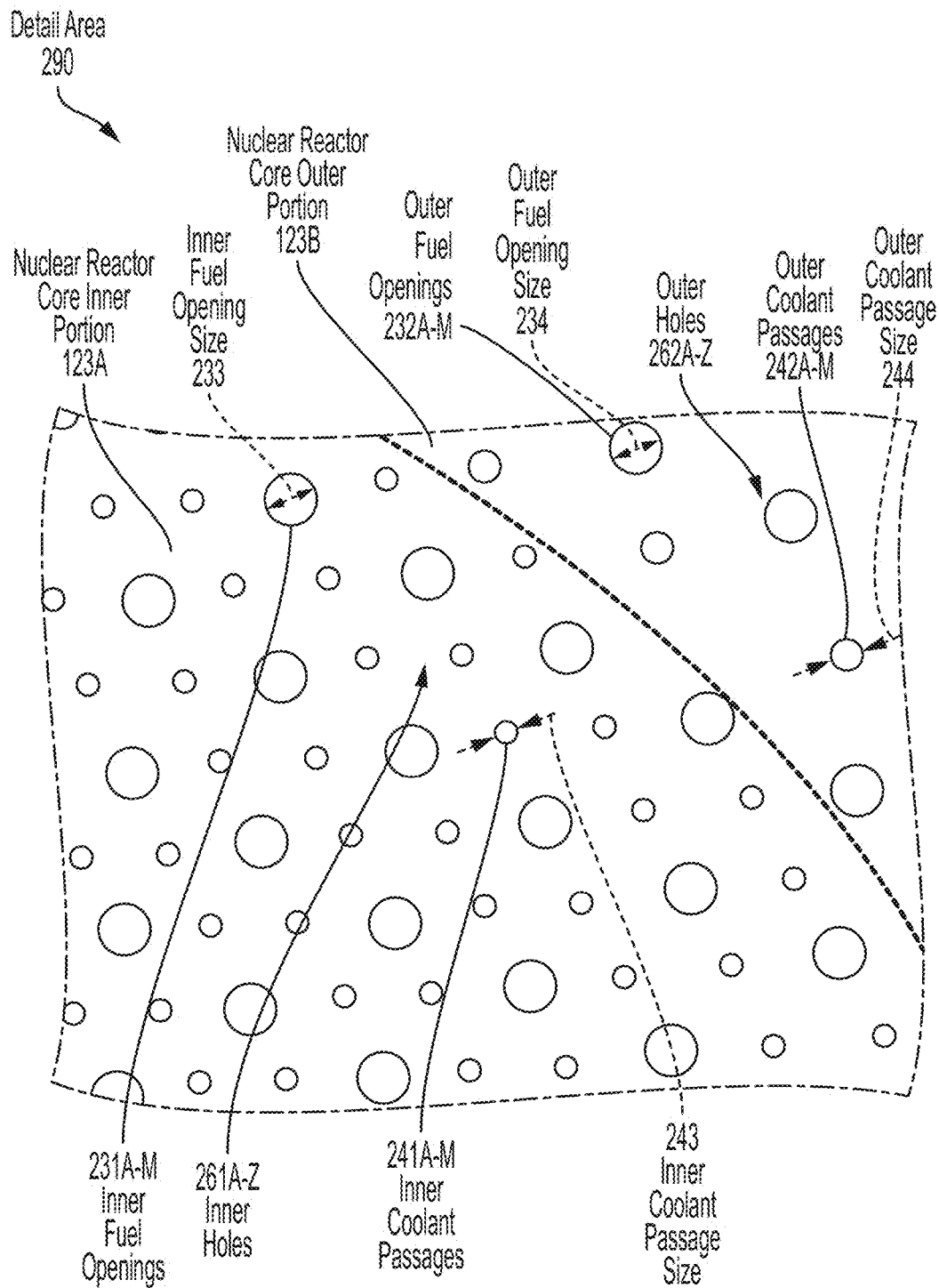
FIG. 2B is a zoomed-in view of the cross-section of the nuclear reactor core of FIG. 2A showing details of fuel openings with fixed diameter and coolant passages with variable diameter.
Figure 2C:
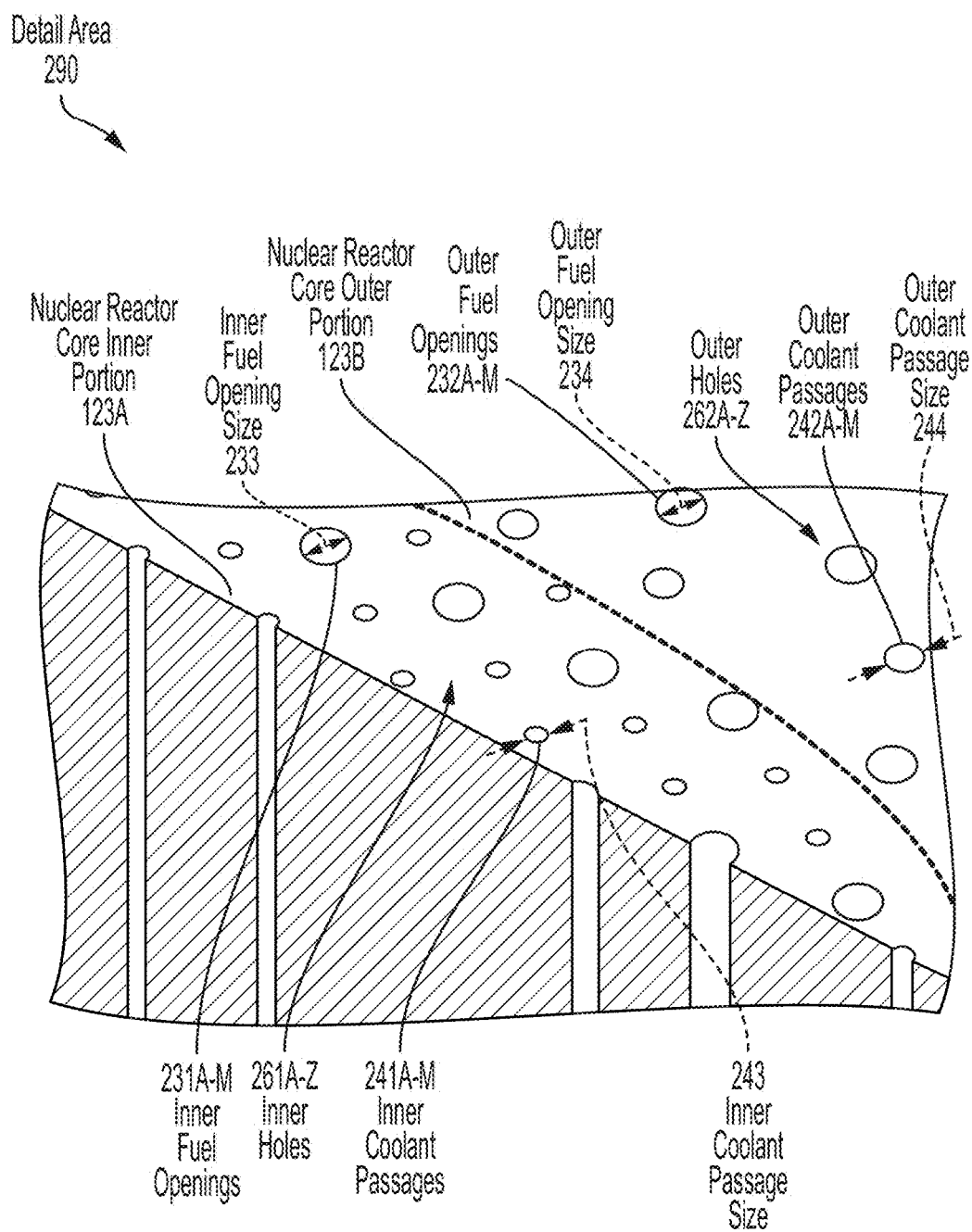
FIG. 2C is an isometric view of the zoomed-in detail view of the nuclear reactor core of FIG. 2B showing details of fuel openings with fixed diameter and coolant passages with variable diameter.
Figure 2D:
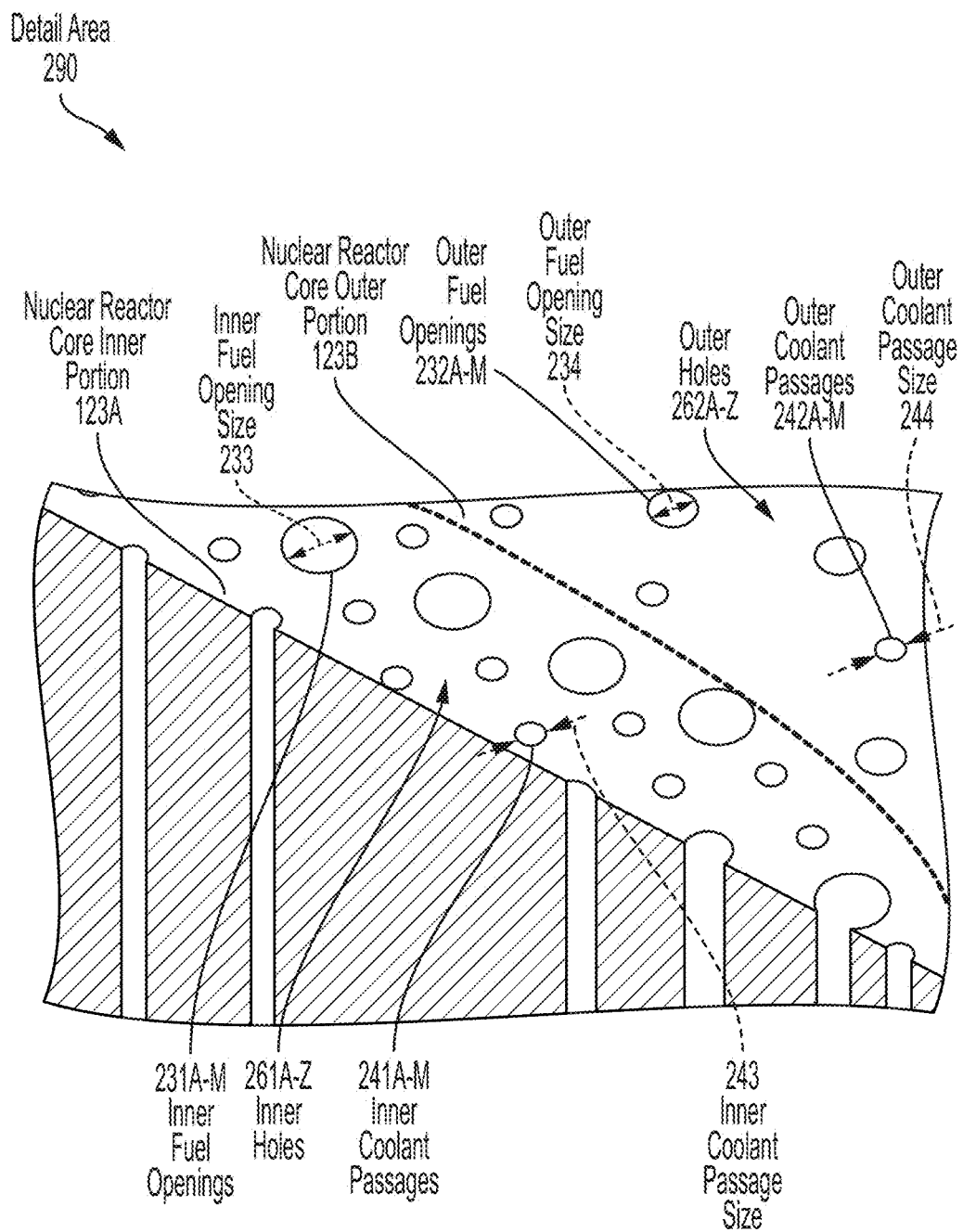
FIG. 2D is an isometric view of an alternative example of the zoomed-in detail view of the nuclear reactor core of FIG. 2B, showing details of fuel openings with variable diameter and coolant passages with fixed diameter.

The skewed-pin moderator block array 113 implements one or more of the following enhancing technologies. First, the skewed-pin moderator block array 113 includes a hole spacing and moderator "web thickness" smaller near a reactor core radial center 156 and larger near a reactor core radial periphery 157, resulting in a "skewed-pin" geometry. Second, as shown in FIG. 2D the skewed-pin moderator block array 113 includes an inner fuel opening size 233 of inner fuel openings 231A-M that is smaller near the nuclear reactor core radial center 156 compared to an outer fuel opening size 234 of outer fuel openings 232A-M near the nuclear reactor core radial periphery 157. Third, as shown in FIGS. 2A-C, the skewed-pin moderator block array 113 includes an inner coolant passage size 243 of inner coolant passages 241A-M that is larger near the nuclear reactor core radial center 156 compared to an outer coolant passage size 244 of outer coolant passages 242A-M near the nuclear reactor core radial core periphery 157. The inner fuel opening size 233, outer fuel opening size 234, inner coolant passage size 243, and outer coolant passage size 244 can be specified in terms of diameter, perimeter, circumference, etc. depending on the shape of inner fuel openings 231A-M, outer fuel openings 232A-M, inner coolant passages 241A-M, and outer coolant passages 242A-M.

Nuclear reactor system 100 can be a high-temperature, gas-cooled, thermal spectrum reactor that implements the skewed-pin moderator block array 113 to minimize the power peaking factor within the nuclear reactor core 101. Reducing the power peaking factor of a nuclear reactor core 101 can allow for the total core power of a nuclear reactor system 100 to be increased. Alternatively, the nuclear reactor core 101 and the nuclear reactor system 100 can be redesigned to be smaller, or less massive, at a fixed power if the power peaking factor is reduced.

By sustaining controlled nuclear fission, the nuclear reactor system 100 produces heat energy. In an example implementation, the nuclear reactor system 100 is implemented as a gas-cooled nuclear reactor 107 where coolant is a gas to achieve performance gains. In the gas-cooled nuclear reactor 107, a high power density, rated power output, and safety case of the nuclear reactor core 101 is enabled by the skewed-pin moderator block array 113. However, the skewed-pin moderator block array 113 technology can also enable breakthrough performance in other thermal spectrum nuclear reactor systems, including large utility scale reactors, heat pipe reactors, and molten-salt-cooled reactors.

In contrast, in a conventional nuclear reactor core with regularly-spaced cylindrical holes, power peaking tends to occur along the radial axis of the reactor core, and the average power density of the nuclear reactor can be limited by a fixed maximum temperature limit of some certain core material. The radial axis of the conventional nuclear reactor core would be located where the nuclear reactor core radial center 156 is located in the depicted nuclear reactor core 101 of FIGS. 1A, 2A, and 3A. In the conventional nuclear reactor core, the population density of fuel openings and coolant passages, representing the spacing between fuel openings and coolant passages, respectively, is generally consistent throughout the nuclear reactor core. Meaning that a given inner unit area 155A near the nuclear core radial center 156 would contain the same number of fuel openings as an outer unit area 155B closer to the nuclear reactor core radial periphery 157. In terms of lateral placement, the nuclear reactor core radial center 156 is a centrally located portion of the nuclear reactor core 101 and longitudinally extends between a top and a bottom of the nuclear reactor core 101. The nuclear reactor core radial center 156 is the centrally located portion at the center of the nuclear reactor core inner portion 113A, and is the within the nuclear reactor core inner portion 113A furthest from the nuclear reactor core outer portion 113B. Therefore, the nuclear reactor core radial center 156 is also the centrally located portion at the center of the inner moderator matrix 121A, and is the within the inner moderator matrix 121A furthest from the outer moderator matrix 121B. The nuclear reactor core radial periphery 157 is an outer located portion of the nuclear reactor core 101. In terms of lateral placement, the nuclear reactor core radial periphery 157 is an outer border of the nuclear reactor core 101 and longitudinally extends between the top and the bottom of the nuclear reactor core 101. The nuclear reactor core radial periphery 157 is the outer perimeter of the nuclear reactor core outer portion 113B, and is an outer boundary of the nuclear reactor core outer portion 113B furthest away from the nuclear reactor core inner portion 113A. Therefore, the nuclear reactor core radial periphery 157 is also the outer boundary of the outer moderator matrix 121B furthest away from the inner moderator matrix 121A.

In a nuclear reactor core 101 implementing a skewed-pin moderator block array 113, the population density of inner fuel openings 131A-M, outer fuel openings 132A-M, inner coolant passages 141A-M, and outer coolant passages 142A-M generally decrease through the nuclear reactor core 101, when viewing the population density of inner fuel openings 131A-M, outer fuel openings 132A-M, inner coolant passages 141A-M, and outer coolant passages 142A-M along a polar axis or between two polar axes of the nuclear reactor core 101 originating from the nuclear reactor core radial center 156 in the direction of the nuclear reactor core radial periphery 157. This means that a given inner unit area 155A near the nuclear core radial center 156 would contain a greater number of inner fuel openings 131A-M than the number of outer fuel openings 132A-M in an outer unit area 155B closer to the nuclear reactor core radial periphery 157.

In some examples, including FIG. 1A, the increase in spacing between inner holes 161A-Z and outer holes 162A-Z is like a gradient change, and the decrease in population density of inner holes 161A-Z and outer holes 162A-Z, is exponential or polynomial. However, the decrease in population density of inner holes 161A-Z and outer holes 162A-Z can be linear and described by any number of area and density functions. The function of the spacing does not need to be a two-dimensional function: for example, a golden ratio spiral two or three-dimensional density function could be used to determine appropriate population density for the inner holes 161A-Z and outer holes 162A-Z. Furthermore, the population density of inner holes 161A-Z and outer holes 162A-Z can be described in a single-step function. In such an example, the skewed-pin moderator block array 113 is divided into a nuclear reactor core inner portion 123A and a nuclear reactor core outer portion 123B. The nuclear reactor core inner portion 123A includes the inner moderator matrix 121A, and is the portion of the nuclear reactor core 101 closest to the nuclear reactor core radial center 156. The nuclear reactor core outer portion 123B includes the outer moderator matrix 121B, and is the portion of the nuclear reactor core 101 closest to the nuclear reactor core radial periphery 157.

In such a skewed-pin moderator block array 113 divided into an inner moderator matrix 121A and an outer moderator matrix 121B, the population density function of the inner holes 161A-Z and outer holes 162A-Z can be further simplified. The inner holes 161A-Z are the holes manufactured within the inner moderator matrix 121A and within the bounds of the nuclear reactor core inner portion 123A, and the outer holes 162A-Z are the holes manufactured within the outer moderator matrix 121B and within the bounds of the nuclear reactor core outer portion 123B. The inner holes 161A-Z form an inner pattern, and include the inner fuel openings 131A-M, which are the fuel openings within the bounds of the nuclear reactor core inner portion 123A, and the inner coolant passages 141A-M, which are the coolant passages within the bounds of the nuclear reactor core inner portion 123A. The outer holes 162A-Z form an outer pattern, and include the outer fuel openings 132A-M, which are the fuel openings within the bounds of the nuclear reactor core outer portion 123B, and the outer coolant passages 142A-M, which are the coolant passages within the bounds of the nuclear reactor core outer portion 123B. The inner and outer patterns of inner holes 161A-Z and outer holes 162A-Z in the inner moderator matrix 121A and the outer moderator matrix 121B come together to form a moderator web 122, which is the pattern and collection of inner holes 161A-Z and outer holes 162A-Z within the moderator matrices 121A-B.

To reduce the power peaking factor in the nuclear reactor core 101, a lower population density of outer holes 162A-Z in the outer moderator matrix 121B than the population density of inner holes 161A-Z in the inner moderator matrix 121A is effective. Therefore, even a single step reduction, for example a step from having thirty-six inner holes 161A-Z in a sample inner unit area 155A within the inner moderator matrix 121A to a step of eighteen outer holes 162A-Z in a sample outer unit area 155B of the same dimensions, will reduce the power peaking factor. For example, a nuclear reactor core 101 can include a uniform population density of outer holes 162A-Z such that an outer moderator matrix density of the outer moderator matrix 121B is uniform throughout. The nuclear reactor core 101 can also include a uniform population density of inner holes 161A-Z such that an inner moderator matrix density of the inner moderator matrix 121A is uniform throughout. When the outer moderator matrix density is less than the inner moderator matrix density as shown in FIG. 1A, then the nuclear reactor core 101 experiences a lower power peaking factor than a conventional nuclear reactor core where the outer moderator matrix density is equal to the inner moderator matrix density. These features are depicted in the detail area 190, shown in further detail in FIGS. 1B-C.

Additionally, as noted previously, the power peaking factor comes in two forms: the radial pin power peaking factor as well as the coolant channel power peaking factor. The radial pin power peaking factor is driven by the inner fuel openings 131A-M and outer fuel openings 132A-M, whereas the coolant channel power peaking factor is driven by the inner coolant passages 141A-M and outer coolant passages 142A-M. The population density of the inner fuel openings 131A-M and outer fuel openings 132A-M or a population density function describing the population density of the inner fuel openings 131A-M and outer fuel openings 132A-M does not need to mirror the population density of the inner coolant passages 141A-M and outer coolant passages 142A-M or a population density function describing the population density of the inner coolant passages 141A-M and outer coolant passages 142A-M. For example, the peaking of the coolant passage power peaking can be more extreme than the peaking of the radial pin power peaking. If so, the function describing the population density of the inner coolant passages 141A-M and outer coolant passages 142A-M may describe a greater decrease in population density than the function describing the population density of the inner fuel openings 131A-M and outer fuel openings 132A-M. These population density differences may be based on the fuel elements 150A-N, the coolant selected for the inner coolant passages 141A-M and outer coolant passages 142A-M, and may be based upon the flow rate and viscosity of the coolant selected. Additionally, different inner fuel openings 131A-M, outer fuel openings 132A-M, inner coolant passages 141A-M, and outer coolant passages 142A-M may have different nuclear fuels and different types of coolant, either interspersed or based upon proximity to the nuclear reactor core radial center 156.

In the depicted example, the nuclear reactor system 100 with the nuclear reactor core 101 is utilized in a space environment, such as in a nuclear thermal propulsion (NTP) system. An example NTP system that the skewed-pin moderator block array 113 of the nuclear reactor core 101 can be implemented in is described in FIGS. 1-2 and the associated text of U.S. Pat. No. 10,643,754 to Ultra Safe Nuclear Corporation of Seattle, Washington, issued May 5, 2020, titled "Passive Reactivity Control of Nuclear Thermal Propulsion Reactors" the entirety of which is incorporated by reference herein. In another example, the nuclear reactor system 100 with the nuclear reactor core 101 is utilized in a space reactor for electrical power production on a planetary surface.

Conventional space reactor designs typically utilize special nuclear material (e.g., Category I) such as Uranium-235, Uranium-239, or Plutonium-239 to have both low-mass and high-temperature output. The architecture for the nuclear reactor core 101 described herein is directly applicable to enabling the development of low-mass, high-temperature, low-enriched uranium (LEU) fueled special nuclear material (e.g., Categories II and III) nuclear reactors to increase efficiency and can be designed specifically for space applications. For example, the nuclear reactor core 101 can be a nuclear thermal rocket reactor, nuclear electric propulsion reactor, Martian surface reactor, or lunar surface reactor.

In such an NTP system (e.g., compact space nuclear reactor), a generated thrust propels a vehicle that houses, is formed integrally with, connects, or attaches to the nuclear reactor core 101, such as a rocket, drone, unmanned air vehicle (UAV), aircraft, spacecraft, missile, etc. Typically, this is done by heating a propellant, typically low molecular weight hydrogen to over 2,600 Kelvin by harnessing thermal energy from the nuclear reactor core 101. In addition, the NTP nuclear reactor system 100 can be used in the propulsion of submarines or ships.

As noted above, the nuclear reactor system 100 can also be a nuclear power plant in a terrestrial land application, e.g., for providing nuclear power (e.g., thermal and/or electrical power) for remote region applications, including outer space, celestial bodies, planetary bodies, and remotes regions on Earth. An example terrestrial land nuclear reactor system that the skewed-pin moderator block array 113 of the nuclear reactor core 101 can be implemented in is described in FIG. 1A and the associated text of U.S. Patent Pub. No. 2020/0027587 to Ultra Safe Nuclear Corporation of Seattle, Washington, published Jan. 23, 2020, titled "Composite Moderator for Nuclear Reactor Systems," the entirety of which is incorporated by reference herein.

Nuclear reactor system 100 can also be a terrestrial power system, such as a nuclear electric propulsion (NEP) system for fission surface power (FSP) system. NEP powers electric thrusters such as a Hall-effect thruster for robotic and human spacecraft. FSP provides power for planetary bodies such as the moon and Mars. In the NEP and FSP power applications, the nuclear reactor core 101 enabled with the skewed-pin moderator block array 113 technology heats a working fluid (e.g., He, HeXe, Ne, $CO_2$) through a power conversion system (e.g., Brayton) to produce electricity. Moreover, in the NEP and FSP power applications, the nuclear reactor core 101 does not include a propellant, but rather includes a working fluid that passes through a reactor inlet when producing power. In the NEP and FSP power applications, the skewed-pin moderator blocks 103A-N can be cooled via the reactor inlet working fluid (e.g., the flow coming out of a recuperator).

Utilizing the skewed-pin moderator block array 113 technology described herein enables a nuclear reactor system 100 that is high-temperature, compact, accident tolerant, and operates safely and reliably throughout the lifetime of the nuclear reactor system 100. For example, the nuclear reactor core 101 can be within a small commercial fission power system for near term space operations, lunar landers, or a commercial fission power system for high-power spacecraft and large-scale surface operations, such as in-situ resource utilization.

As shown, nuclear reactor core 101 includes a skewed-pin moderator block array 113, which implements skewed-pin moderator block technology. Skewed-pin moderator block technology enables building of a compact nuclear reactor system 100 with reduced power peaking, as well as a large enough power density, rated power output, and lifetime that is commercially viable. As shown, skewed-pin moderator block array 113 includes one or more skewed-pin moderator blocks 103A-N. A respective skewed-pin moderator block 103A-N can be formed of, for example, a low-temperature solid-phase moderator. However, the skewed-pin moderator blocks 103A-N is not limited to being a low-temperature moderator, and can be a high-temperature or moderate temperature moderator.

The skewed-pin moderator blocks 103A-N can include low density carbides, metal-carbides, metal-oxides, or a combination thereof. Additionally, any solid neutron-moderating materials, such as graphite, other forms of carbon such as industrial diamond or amorphous carbon, beryllium metal, beryllium oxide, beryllides such as beryllium-zirconium, hydrides such as zirconium hydride or yttrium hydride, or compounds and composite materials containing neutron moderating materials, such as hydrides or beryllides in a high-temperature matrix such as MgO, SiC, or ZrC. Further, the skewed-pin moderator blocks 103A-N can include low density SiC, stabilized zirconium oxide, aluminum oxide, low density ZrC, low density carbon, or a combination thereof. The skewed-pin moderator blocks 103A-N can also be formed of a low-temperature solid-phase moderator, including $MgH_x$, $YH_x$, $ZrH_x$, $CaH_x$, $ZrO_x$, $CaO_x$, $BeO_x$, $BeC_x$, Be, enriched boron carbide, $^{11}B_4C$, $CeH_x$, $LiH_x$, or a combination thereof.

Nuclear reactor core 101 further includes fuel elements 150A-N, which are formed into a fuel shape to increase heat transfer into the fuel elements 150A-N and effectively reduce safety margins, provide higher power nuclear reactor systems, and consequently improve the economics of the nuclear reactor core 101.

Each of the fuel elements 150A-N includes a nuclear fuel. The nuclear fuel includes a fuel compact (e.g., cylindrical or other suitable shape) comprised of coated fuel particles, such as tristructural-isotropic (TRISO) fuel particles embedded inside a high-temperature matrix. In some implementations, the nuclear fuel includes a fuel compact comprised of bistructural-isotropic (BISO) fuel particles embedded inside the high-temperature matrix. The high-temperature matrix includes silicon carbide, zirconium carbide, titanium carbide, niobium carbide, tungsten, molybdenum, or a combination thereof. Each of the TRISO fuel particles can include a fuel kernel surrounded by a porous carbon buffer layer, an inner pyrolytic carbon layer, a binary carbide layer (e.g., ceramic layer of SiC or a refractory metal carbide layer), and an outer pyrolytic carbon layer. The refractory metal carbide layer of the TRISO fuel particles can include at least one of titanium carbide (TiC), zirconium carbide (ZrC), niobium carbide (NbC), tantalum carbide, hafnium carbide, ZrC—$ZrB_2$ composite, ZrC—$ZrB_2$—SiC composite, or a combination thereof. The high-temperature matrix can be formed of the same material as the binary carbide layer of the TRISO fuel particles.

TRISO-like coatings may be simplified or eliminated depending on safety implications and manufacturing feasibility. TRISO fuel particles are designed to withstand fission product build up inside a nuclear reactor core 101. Although the fuel elements 150A-N in the example include coated fuel particles, such as TRISO fuel particles or BISO fuel particles, the fuel elements 150A-N can include uncoated fuel particles.

A description of TRISO fuel particles dispersed in a silicon carbide matrix to form a cylindrical shaped nuclear fuel compact is provided in the following patents and publications of Ultra Safe Nuclear Corporation of Seattle, Washington: U.S. Pat. No. 9,299,464, issued Mar. 29, 2016, titled "Fully Ceramic Nuclear fuel and Related Methods"; U.S. Pat. No. 10,032,528, issued Jul. 24, 2018, titled "Fully Ceramic Micro-encapsulated (FCM) fuel for CANDUs and Other Reactors"; U.S. Pat. No. 10,109,378, issued Oct. 23, 2018, titled "Method for Fabrication of Fully Ceramic Microencapsulation Nuclear Fuel"; U.S. Pat. No. 9,620,248, issued Apr. 11, 2017 and U.S. Pat. No. 10,475,543, issued Nov. 12, 2019, titled "Dispersion Ceramic Micro-encapsulated (DCM) Nuclear Fuel and Related Methods"; U.S. Patent Pub. No. 2020/0027587, published Jan. 23, 2020, titled "Composite Moderator for Nuclear Reactor Systems"; and U.S. Pat. No. 10,573,416, issued Feb. 25, 2020, titled "Nuclear Fuel Particle Having a Pressure Vessel Comprising Layers of Pyrolytic Graphite and Silicon Carbide," the entireties of which are incorporated by reference herein. As described in those Ultra Safe Nuclear Corporation patents, the nuclear fuel generally includes a cylindrical fuel compact or pellet comprised of TRISO fuel particles embedded inside a silicon carbide matrix to create the cylindrical shaped nuclear fuel compact.

TRISO fuel particles are designed not to crack due to the stresses or fission gas pressure at temperatures beyond 1,600° C., and therefore can contain the fuel kernel in the worst of accident scenarios. TRISO fuel particles are designed for use in high-temperature gas-cooled reactors (HTGR) that include the nuclear reactor core 101 and to be operating at temperatures much higher than the temperatures of LWRs. TRISO fuel particles have extremely low failure below 1500° C.

Fuel elements 150A-N formed of TRISO fuel particles can be formed through direct current sintering (DCS). Fuel elements 150A-N achieve high levels of fuel burnup (>>100 GWd/tonne), operate at extreme temperatures (e.g., approximately 1,200° C.), and have excellent behavior under irradiation. Fuel elements 150A-N can include greater than 50% volume packing fraction of TRISO fuel particles. TRISO fuel particles can include a fuel kernel coated by alternating or sequential layers of a low density carbon, a binary carbide layer, and a pyrolytic graphite. Binary carbide layer can include silicon carbide (SiC) or a refractory metal carbide, such as titanium carbide (TiC), zirconium carbide (ZrC), niobium carbide (NbC), or a combination thereof. When the binary carbide layer is formed of the refractory metal carbide, several advantages can be provided. First, the refractory metal carbide that forms the binary carbide layer allows the TRISO fuel particles to provide multiple barriers of protection that retain the fissile fuel kernel for ultra-high temperature operation (>3000 degrees Kelvin). Second, the refractory metal carbide also attenuates fission products to reduce irradiation damage of the skewed-pin moderator block 103A-N. The refractory carbide layer thus behaves as a pressure vessel layer that traps fission products to prevent escape into the coolant (e.g., propellant, such as hydrogen) in the nuclear reactor system 100.

In an NTP, NEP, or FSP nuclear reactor system 100, the nuclear reactor 107 can include a plurality of control drums 115A-N that occupy a plurality of control drum channels 135A-N formed in skewed-pin moderator blocks 103A-N. Control drums 115A-N are rotated within the control drum channels 135A-N. The control drums 115A-N may laterally surround the skewed-pin moderator block array 113 of skewed-pin moderator blocks 103A-N, and fuel elements 150A-N to change reactivity of the nuclear reactor core 101 by rotating the control drums 115A-N. As depicted, the control drums 115A-N reside on the perimeter or periphery of a pressure vessel 160 and are positioned circumferentially around the skewed-pin moderator blocks 103A-N and fuel elements 150A-N of the nuclear reactor core 101. Control drums 115A-N may be located in an area of the outer moderator matrix 121B and an optional reflector 140, e.g., an outer reflector region immediately surrounding the nuclear reactor core 101, to selectively regulate the neutron population and nuclear reactor power level during operation. The optional reflector 140 can include a plurality of reflector blocks laterally surrounding the outer moderator matrix 121B; and the outer moderator matrix 121B laterally surrounds the inner moderator matrix 121A.

For example, the control drums 115A-N can be a cylindrical shape and formed of both a reflector material 116 (e.g., beryllium (Be), beryllium oxide (BeO), BeSiC, BeMgO, $Al_2O_3$, etc.) on a first outer surface and an absorber material 117 on a second outer surface. The reflector material 116 and the absorber material 117 can be on opposing sides of the cylindrical shape, e.g., portions of an outer circumference, of the control drums 115A-N. The reflector material 116 can include a reflector substrate shaped as a cylinder or a truncated portion thereof. The absorber material 117 can include an absorber plate or an absorber coating. The absorber plate or the absorber coating are disposed on the reflector substrate to form the cylindrical shape of each of the control drums 115A-N. For example, the absorber plate or the absorber coating covers the reflector substrate formed of the reflector material to form the control drums 115A-N.

Rotating the depicted cylindrical-shaped control drums 115A-N changes proximity of the absorber material 117 (e.g., boron carbide, $B_4C$) of the control drums 115A-N to the nuclear reactor core 101 to alter the amount of neutron reflection. When the reflector material 116 is inwards facing towards the nuclear reactor core 101 and the absorber material 117 is outwards facing, neutrons are scattered back (reflected) into the nuclear reactor core 101 to cause more fissions and increase reactivity of the nuclear reactor core 101. When the absorber material 117 is inwards facing towards the nuclear reactor core 101 and the reflector material 116 is outwards facing, neutrons are absorbed and further fissions are stopped to decrease reactivity of the nuclear reactor core 101. In a terrestrial land application, the nuclear reactor core 101 may include control rods (not shown) composed of chemical elements such as boron, silver, indium, and cadmium that are capable of absorbing many neutrons without themselves fissioning.

Pressure vessel 160 can be formed of aluminum alloy, carbon-composite, titanium alloy, a radiation resilient SiC composite, nickel based alloys (e.g., Inconel™ or Haynes™), or a combination thereof. Pressure vessel 160 and the nuclear reactor core 101 can be comprised of other components, including cylinders, piping, and storage tanks that transfer a coolant, such as a propellant (e.g., hydrogen gas or liquid), that flows through inner coolant passages 141A-M and outer coolant passages 142A-M. The coolant can be a gas or a liquid, e.g., that transitions from a liquid to a gas state during a burn cycle of the nuclear reactor core 101 for thrust generation in an NTP nuclear reactor system 100. Hydrogen is for an NTP nuclear reactor system 100. In an NEP or FSP nuclear reactor 107, a working fluid, such as He, neon, HeXe, $CO_2$, etc. is circulated instead. A coolant loop may actively remove heat from the skewed-pin moderator blocks 103A-N to maintain the skewed-pin moderator blocks 103A-N at a lower temperature during operation of the nuclear reactor core 101.

Nuclear reactor system 100 enables the coolant to flow through the inner coolant passages 141A-M and outer coolant passages 142A-M. The inner coolant passages 141A-M and outer coolant passages 142A-M are channels or holes to allow the fuel coolant to pass through in the nuclear reactor core 101 and into a thrust chamber (not shown) for propulsion in a separate nuclear fuel coolant loop, for example. Alternatively, the inner coolant passages 141A-M and outer coolant passages 142A-M allow the coolant to pass through in the nuclear reactor core 101 and into a heat sink (not shown) via a dedicated coolant loop, for example. The coolant that flows through the skewed-pin moderator blocks 103A-N can include helium, FLiBe molten salt formed of lithium fluoride (LiF), beryllium fluoride ($BeF_2$), sodium, He, HeXe, $CO_2$, neon, or HeN.

With respect to the heat sink, for a closed-loop power cycle the most direct method for lowering temperature is the cold end of the power cycle. Another option is an unheated reactor inlet, where the coolant comes from cool parts of the power cycle such as a reactor inlet, compressor outlet, or the cold end of the power cycle. In addition, an external heat sink, external cold sink, or a separate power cycle altogether can also be employed.

Referring to the depicted example of FIG. 1A, a nuclear reactor core 101 includes a plurality of fuel elements 150A-N, and a skewed-pin moderator block array 113 of one or more skewed-pin moderator blocks 103A-N to form a nuclear reactor core inner portion 123A and a nuclear reactor core outer portion 123B. The nuclear reactor core inner portion 123A includes an inner moderator matrix 121A formed of a plurality of inner holes 161A-Z. The plurality of inner holes 161A-Z include a plurality of inner fuel openings 131A-M with one or more of the fuel elements 150A-N disposed therein, and also includes a plurality of inner coolant passages 141A-M to flow a coolant. The nuclear reactor core outer portion 123B includes an outer moderator matrix 121B formed of a plurality of outer holes 162A-Z. The plurality of outer holes 162A-Z include a plurality of outer fuel openings 132A-M with one or more of the fuel elements 150A-N disposed therein, and also includes a plurality of outer coolant passages 142A-M to flow the coolant. The inner holes 161A-Z of the inner moderator matrix 121A are irregularly spaced with respect to the outer holes 162A-Z of the outer moderator matrix 121B. In an example, irregularly spaced means the spacing is non-uniform spacing.

Further, the inner holes 161A-Z of the inner moderator matrix 121A are irregularly spaced with respect to the outer holes 162A-Z of the outer moderator matrix 121B such that an inner pattern of the inner holes 161A-Z is clustered more closely together compared to an outer pattern of the outer holes 162A-Z of the outer moderator matrix 121B.

Additionally, the inner holes 161A-Z are clustered more closely together such that an inner hole spacing between the inner holes 161A-Z of the inner moderator matrix 121A is smaller compared to an outer hole spacing between the outer holes 162A-Z of the outer moderator matrix 121B.

Still further, the inner fuel openings 131A-M of the inner moderator matrix 121A are clustered more closely together compared to the outer fuel openings 132A-M of the outer moderator matrix 121B. The inner coolant passages 141A-M of the inner moderator matrix 121A are clustered more closely together compared to the outer coolant passages 142A-M of the outer moderator matrix 121B.

The inner moderator matrix 121A and the outer moderator matrix 121B collectively form a moderator web 122 that minimizes a power peaking factor of the nuclear reactor core 101. The moderator web 122 includes a non-uniform clustering such that the inner moderator matrix 121A includes a tighter clustering of the inner holes 161A-Z compared to the outer holes 162A-Z of the outer moderator matrix 121B. The power peaking factor is defined as a highest local power density of the nuclear reactor core 101 divided by an average power density of the nuclear reactor core 101.

In particular, the inner holes 161A-Z are irregularly spaced with respect to the outer holes 162A-Z of the outer moderator matrix 121B such that an inner hole density of the inner holes 161A-Z is higher compared to an outer hole density of the outer holes 162A-Z. The inner hole density is number of the inner holes 161A-Z per inner unit area 155A of the inner moderator matrix 121A, and the outer hole density is number of the outer holes 162A-Z per outer unit area 155B of the outer moderator matrix 121B.

Further, a fuel opening density decreases when moving radially outwards from the inner moderator matrix 121A to the outer moderator matrix 121B. Generally, the fuel opening density is number of inner fuel openings 131A-M and outer fuel openings 131A-M per unit area 155A-B. Hence, an inner fuel opening density in the inner unit area 155A is number of inner fuel openings 131A-M per inner unit area 155A; and an outer fuel opening density in the outer unit area 155B is number of outer fuel openings 132A-M per outer unit area 155B. The inner fuel opening density is higher than the outer fuel opening density. The coolant passage density decreases when moving radially outwards from the inner moderator matrix 121A to the outer moderator matrix 121B. Generally, coolant passage density is number of inner coolant passages 141A-M and outer coolant passages 142A-M per unit area 155A-B. Hence, an inner coolant passage density in the inner unit area 155A is number of inner coolant passages 141A-M per inner unit area 155A; and an outer coolant passage density in the outer unit area 155B is number of outer coolant passages 142A-M per outer unit area 155B. The inner coolant passage density is higher than the outer coolant passage density.

Still further, the fuel opening density continuously decreases when moving radially outwards from the inner moderator matrix 121A to the outer moderator matrix 121B. The coolant passage density continuously decreases when moving radially outwards from the inner moderator matrix 121A to the outer moderator matrix 121B.

Additionally, a fuel opening number counting the one or more inner fuel openings 131A-M per unit length or inner unit area 155A and one or more outer fuel openings 132A-M per unit length or outer unit area 155B decreases from the nuclear reactor core radial center 156 to the nuclear reactor core radial periphery 157 from a first fuel opening number per unit length or inner unit area 155A to a second fuel opening number per unit length or outer unit area 155B. A coolant passage number counting the one or more inner coolant passages 141A-M per unit length or inner unit area 155A and one or more outer coolant passages 142A-M per unit length or outer unit area 155B decreases from the nuclear reactor core radial center 156 to the nuclear reactor core radial periphery 157 from a first coolant passage number per unit length or inner unit area 155A to a second coolant passage number per unit length or outer unit area 155B.

Figure 1B:
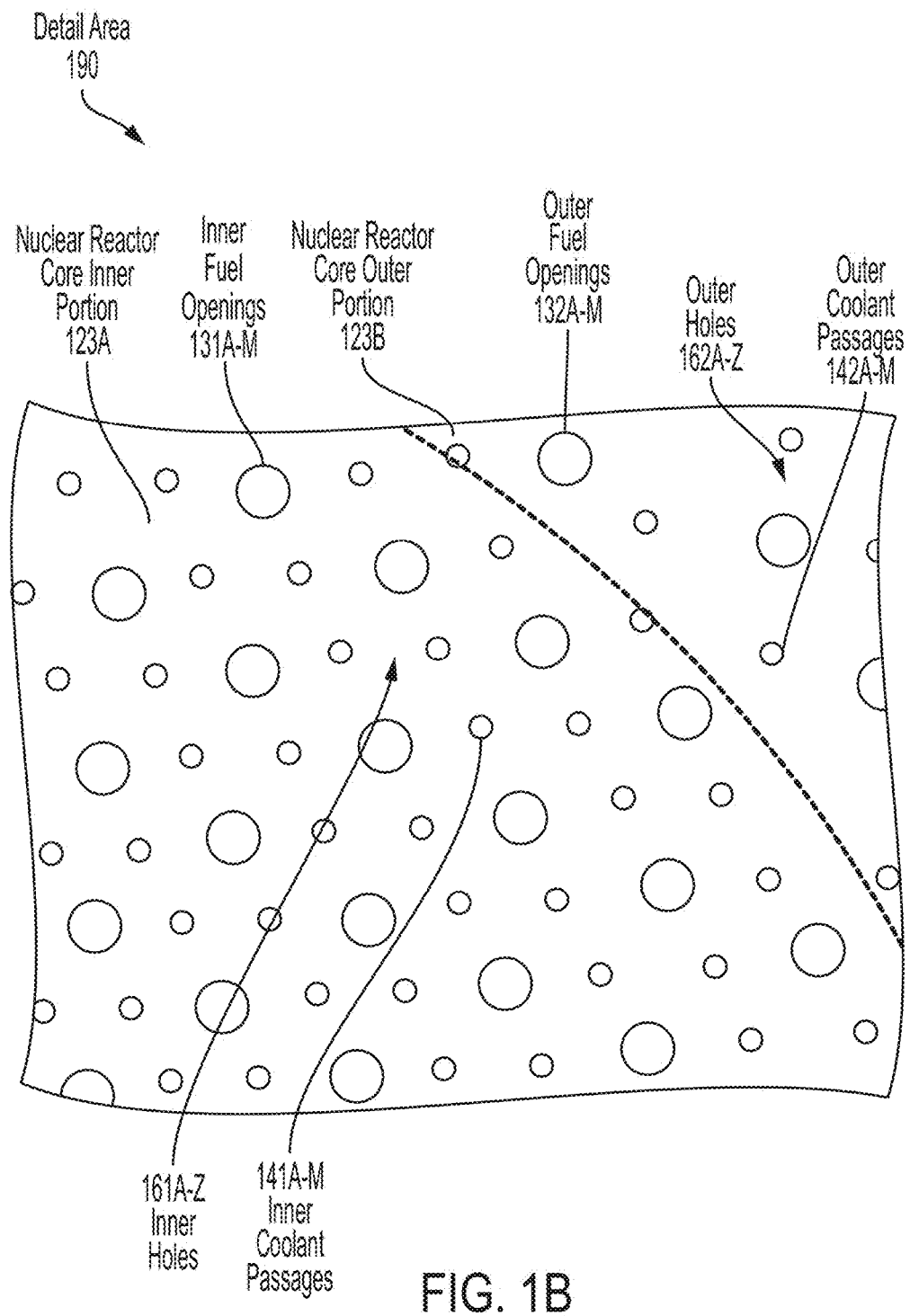
FIG. 1B is a zoomed-in view of the cross-section of the nuclear reactor core of FIG. 1A showing details of fuel openings with fixed diameter and coolant passages with fixed diameter.

FIG. 1B is a zoomed-in view of the detail area 190 of the nuclear reactor core 101 of FIG. 1A showing details of inner fuel openings 131A-M, outer fuel openings 132A-M, inner coolant passages 141A-M, and outer coolant passages 142A-M. In particular, the detail area 190 shows the inner holes 161A-Z of the nuclear reactor core inner portion 123A are irregularly spaced with respect to the outer holes 162A-Z of the nuclear reactor core outer portion 123B such that an inner pattern of the inner holes 161A-Z is clustered more closely together compared to an outer pattern of the outer holes 162A-Z of the nuclear reactor core outer portion 123B. Consequently, the inner holes 161A-Z are clustered more closely together such that an inner hole spacing between the inner holes 161A-Z of the nuclear reactor core inner portion 123A is smaller compared to an outer hole spacing between the outer holes 162A-Z of the nuclear reactor core outer portion 123B. Although the fuel opening density and the coolant passage density gradually decreases when moving outwards from the nuclear reactor core inner portion 123A to the nuclear reactor core outer portion 123B, the views of the detail area 190 in FIGS. 1B-C and detail area 290 in FIGS. 2B-F are somewhat exaggerated to illustrate the clustering difference.

Furthermore, the detail area 190 shows both the inner fuel openings 131A-M and outer fuel openings 132A-M, as well as the inner coolant passages 141A-M and the outer coolant passages 142A-M exhibiting this behavior. Therefore, the inner fuel openings 131A-M of the nuclear reactor core inner portion 123A are clustered more closely together compared to the outer fuel openings 132A-M of the nuclear reactor core outer portion 123B. The inner coolant passages 141A-M of the nuclear reactor core inner portion 123A are clustered more closely together compared to the outer coolant passages 142A-M of the nuclear reactor core outer portion 123B.

Figure 1C:
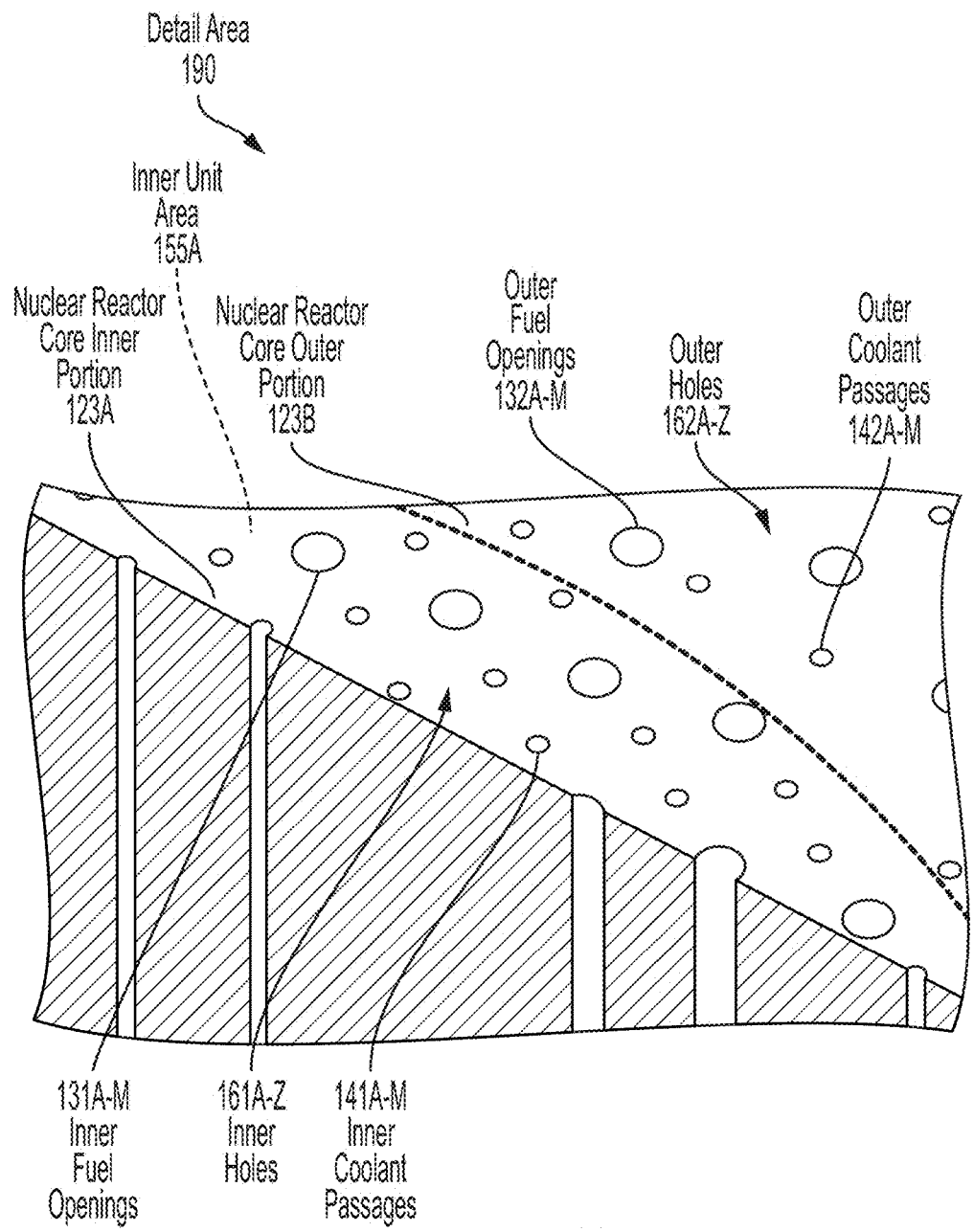
FIG. 1C is an isometric view of the zoomed-in detail view of the nuclear reactor core of FIG. 1B showing details of fuel openings with fixed diameter and coolant passages with fixed diameter.

FIG. 1C is an isometric view of the detail area 190 of the nuclear reactor core 101 of FIG. 1A showing details of inner fuel openings 131A-M, outer fuel openings 132A-M, inner coolant passages 141A-M, and outer coolant passages 142A-M.

In some examples, the inner fuel openings 131A-M and outer fuel openings 132A-M are depicted as a cylindrical shape, and the inner coolant passages 141A-M and outer coolant passages 142A-M are also depicted as a cylindrical shape. However, the skewed-pin moderator blocks 103A-N, inner fuel openings 131A-M, outer fuel openings 132A-M, inner coolant passages 1421A-M, and outer coolant passages 142A-M can be formed as a variety of shapes. In addition to being a circular or other round shape in two-dimensional space, the inner fuel openings 131A-M, outer fuel openings 132A-M, inner coolant passages 141A-M, and outer coolant passages 142A-M can be oval, square, rectangular, triangular, or another polygon shape.

The architecture of the nuclear reactor core 101 reduces power peaking, thereby improving cooling of the skewed-pin moderator blocks 103A-N, in the nuclear reactor core 101. If allowed to reach higher temperatures, the skewed-pin moderator blocks 103A-N may begin to dissociate or decompose, resulting in a net loss of reactivity, slowing the fission or chain reaction. By using a skewed-pin formation of inner holes 161A-Z and outer holes 162A-Z, in particular inner fuel openings 131A-M, outer fuel openings 132A-M, inner coolant passages 141A-M, and outer coolant passages 142A-M, a high-temperature nuclear reactor core 101 optimized for small size is achieved.

The one or more skewed-pin moderator blocks 103A-N can include graphite, carbon, carbide, beryllium (e.g., beryllium metal), beryllium oxide, beryllide, hydride, or a combination thereof. In an example, use of a low-temperature solid-phase moderator to form the skewed-pin moderator blocks 103A-N can be useful for high-temperature nuclear reactors optimized for small size that use low-enriched uranium (LEU) as nuclear fuel. The low-temperature solid-phase moderator includes $MgH_x$, $YH_x$, $ZrH_x$, $CaH_x$, $ZrO_x$, $CaO_x$, $BeO_x$, $BeC_x$, Be, enriched boron carbide, $^{11}B_4C$, $CeH_x$, $LiH_x$, or a combination thereof. Because the low-temperature solid-phase moderator that forms the skewed-pin moderator blocks 103A-N has a higher moderating power and slowing down ratio (macroscopic slowing down power), the low-temperature solid-phase moderator enables a compact nuclear reactor core 101 with smaller amounts of fissile material within the fuel elements 150A-N (e.g., reduces the amount of uranium needed in the nuclear reactor core 101). The depicted nuclear reactor core 101 thus provides a wider range of operating temperatures, loop configurations, and applications.

Figure 2E:
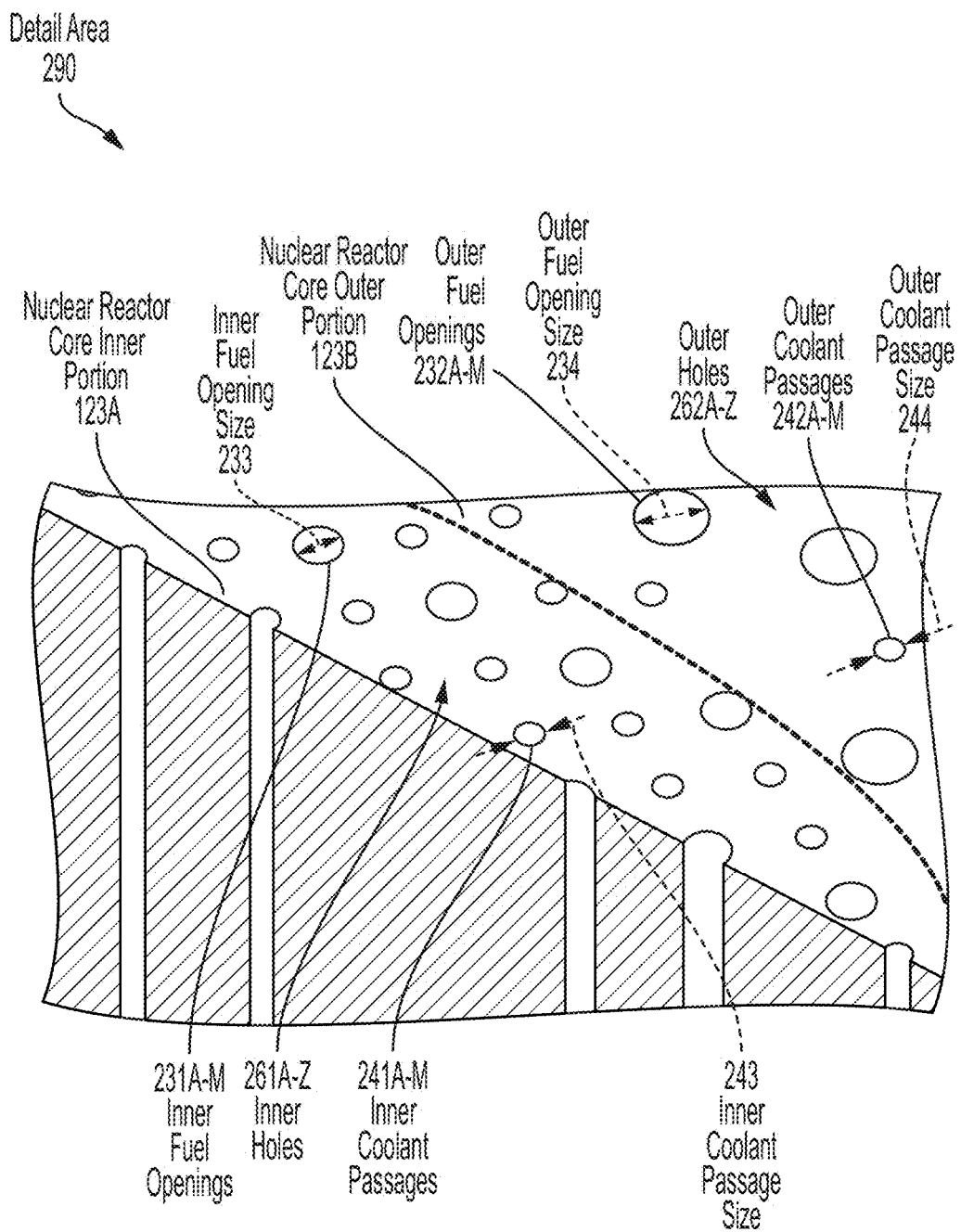
FIG. 2E is a reversed alternative of FIG. 2D, where an outer fuel opening size exceeds an inner fuel opening size.
Figure 2F:
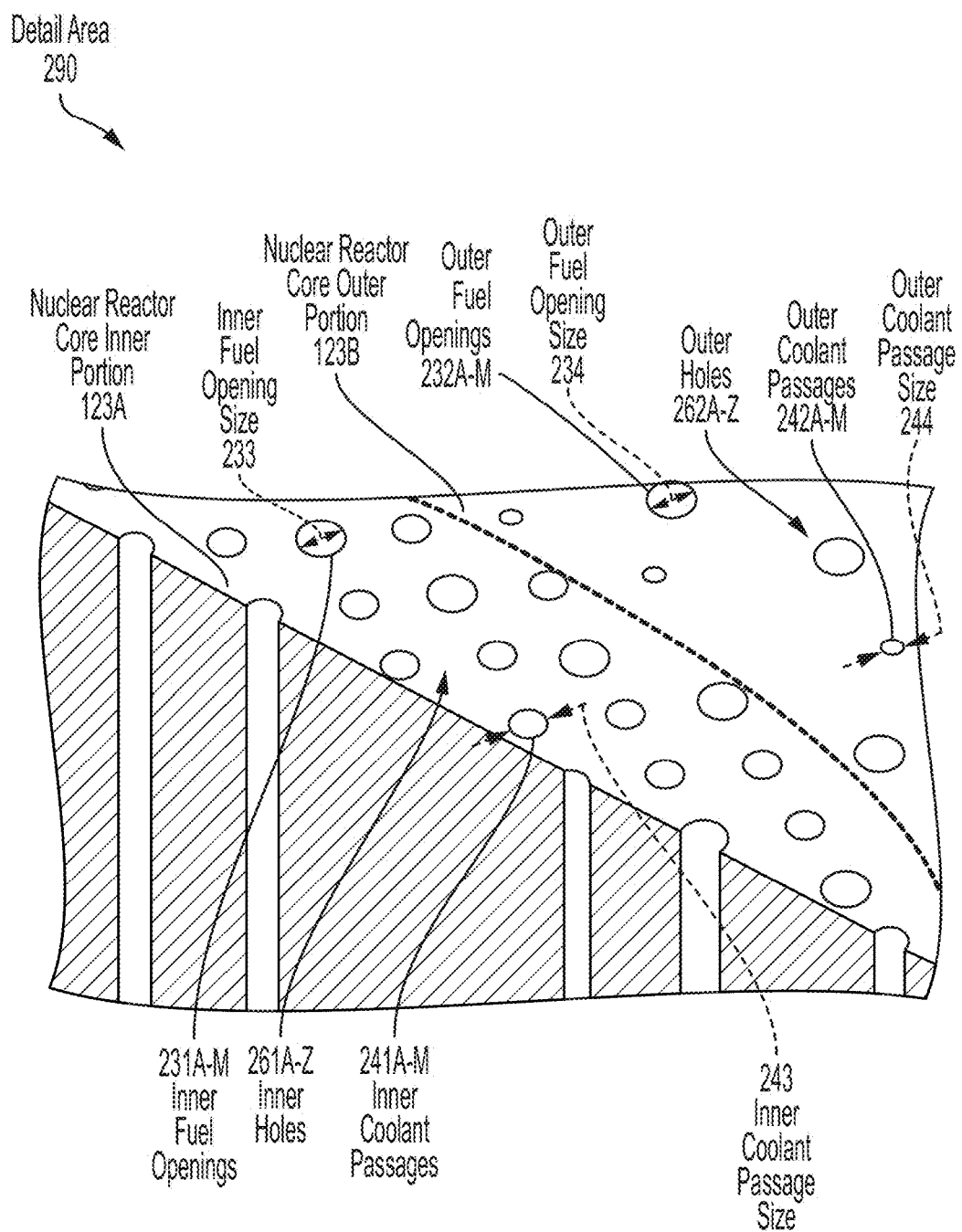
FIG. 2F is a reversed alternative of FIG. 2C, where an inner coolant passage size exceeds an outer coolant passage size.

In FIGS. 1A-C, the fuel opening size of each of the one or more inner fuel openings 131A-M and outer fuel openings 132A-M are consistent, and the coolant passage size of each of the one or more inner coolant passages 141A-M and outer coolant passages 142A-M are also consistent and fixed throughout the skewed-pin moderator block array 113. Meaning, the fuel opening size of each of the one or more inner fuel openings 131A-M is equal to the fuel opening size of a respective fuel opening 132A of the one or more outer fuel openings 132A-M. The coolant passage size of each of the one or more inner coolant passages 141A-M is equal to the coolant passage size of a respective coolant passage 142A of the one or more outer coolant passages 142A-M. However, FIGS. 2A-F depict a similar nuclear reactor core 101, with a variation on inner hole 161A-Z and outer hole 162A-Z sizes. In particular, FIGS. 2B-C and FIG. 2F depict a variation on sizes of the inner coolant passages 241A-M and outer coolant passages 242A-M, while FIGS. 2D-E depicts a variation on the sizes of inner fuel openings 231A-M and outer fuel openings 232A-M.

FIG. 2A depicts a nuclear reactor core 101 with a similar inner fuel opening 231A-M density, outer fuel opening 232A-M density, inner coolant passage 241A-M density, and outer coolant passage 242A-M density as FIG. 1A. FIG. 2B is a zoomed-in view of the detail area 290 of the nuclear reactor core 101 of FIG. 2A showing details of inner fuel openings 231A-M, outer fuel openings 232A-M, inner coolant passages 241A-M, and outer coolant passages 242A-M. FIG. 2C is an isometric view of the detail area 290 of the nuclear reactor core 101 of FIG. 2A showing details of inner fuel openings 231A-M, outer fuel openings 232A-M, inner coolant passages 241A-M, and outer coolant passages 242A-M.

FIGS. 2B-C shows the inner coolant passage size 243 of the inner coolant passages 241A-M, the outer coolant passage size 244 of the outer coolant passages 242A-M, the inner fuel opening size 233 of the inner fuel openings 231A-M, and the outer fuel opening size 234 of the outer fuel openings 232A-M. Specifically, FIGS. 2B-C depict a smaller (e.g., narrower) inner coolant passage size 243 of the inner coolant passages 241A-M as compared to a larger (e.g., wider) outer coolant passage size 244 of the outer coolant passages 242A-M In FIGS. 2B-C, the inner fuel opening size 233 is the same size as the outer fuel opening size 234.

In contrast to FIGS. 1B-C, in FIGS. 2B-C the inner coolant passage size 243 of the inner coolant passages 241A-M and the outer coolant passage size 244 of the outer coolant passages 242A-M vary with the density of the inner coolant passages 241A-M and outer coolant passages 242A-M. The inner coolant passage size 243 and the outer coolant passage size 244 vary based upon the radial position of the related inner coolant passage 241A-M and outer coolant passage 242A-M within the nuclear reactor core 101. This has the practical effect of increasing the amount of coolant in the outer moderator matrix 121B, which may further reduce the heat of the fuel elements 150A-N in the outer fuel openings 232A-M, thereby further reducing radial pin power peaking. As an alternative, the inner coolant passage size 243 of the inner coolant passages 241A-M and outer coolant passage size 244 of the outer coolant passages 242A-M can increase from the nuclear reactor core radial periphery 157 to the nuclear reactor core radial center 156. The increase of coolant towards the nuclear reactor core radial center 156 can further reduce the coolant channel power peaking factor.

In particular, the detail area 290 shows the inner fuel openings 231A-M of the nuclear reactor core inner portion 123A are clustered more closely together compared to the outer fuel openings 232A-M of the nuclear reactor core outer portion 123B. The inner coolant passages 241A-M of the nuclear reactor core inner portion 123A are clustered more closely together compared to the outer coolant passages 242A-M of the nuclear reactor core inner portion 123A. The detail area 290 also shows that the inner coolant passages 241A-M are sized differently and vary in diameter compared to the outer coolant passages 242A-M. Specifically, the outer coolant passage size 244 exceeds the inner coolant passage size 243; therefore, the outer coolant passage diameter exceeds the inner coolant passage diameter.

FIGS. 2D-E are alternative views of the detail area 290 of the nuclear reactor core 101 of FIG. 2A showing alternative details of inner fuel openings 231A-M, outer fuel openings 232A-M, inner coolant passages 241A-M, and outer coolant passages 242A-M. In FIGS. 2D-E, the inner fuel opening size 233 of the inner fuel openings 231A-M and the outer fuel opening size 234 of the outer fuel openings 232A-M vary with the density of the inner fuel openings 231A-M and outer fuel openings 232A-M. These variations in inner fuel opening size 233 and outer fuel opening size 234 can also further reduce power peaking within the nuclear reactor core 101. In particular, the detail area 290 shows the inner fuel openings 231A-M of the nuclear reactor core inner portion 123A are clustered more closely together compared to the outer fuel openings 232A-M of the nuclear reactor core outer portion 123B. The inner coolant passages 241A-M of the nuclear reactor core inner portion 123A are clustered more closely together compared to the outer coolant passages 242A-M of the nuclear reactor core outer portion 123B. In FIG. 2F, the inner coolant passage size 23 of the inner coolant passages 241A-M and the outer coolant passage size 244 of the outer coolant passages 242A-M vary. The population density of the inner coolant passages 241A-M and outer coolant passages 242A-M also varies. These variations in inner coolant passage size 243 and outer coolant passage size 244 and the population density can also further reduce power peaking within the nuclear reactor core 101.

In FIGS. 2D-E, the detail area 290 also shows that the inner fuel openings 231A-M are sized differently and vary in diameter compared to the outer fuel openings 232A-M. Specifically, in FIG. 2D, the inner fuel opening size 233 exceeds the outer fuel opening size 234; therefore, the inner fuel opening diameter exceeds the outer fuel opening diameter. FIG. 2D exhibits a similar effect to the example of FIG. 2C, as in both examples, the ratio of inner fuel opening 231A-M surface area to inner coolant passage 241A-M surface area is higher than the ratio of outer fuel opening 232A-M surface area to outer coolant passage 242A-M surface area. FIG. 2E is the reverse of FIG. 2D, where the outer fuel opening size 234 exceeds the inner fuel opening size 233; therefore, the outer fuel opening diameter exceeds the inner fuel opening diameter.

In FIG. 2F, the detail area 290 also shows that the inner coolant passages 241A-M are sized differently and vary in diameter compared to the outer coolant passages 242A-M. Specifically, the inner coolant passage size 243 exceeds the outer coolant passage size 244; therefore, the inner coolant passage diameter exceeds the outer coolant passage diameter. FIG. 2F exhibits a similar effect to the example of FIG. 2E, as in both examples, the ratio of outer fuel opening 232A-M surface area to outer coolant passage 242A-M surface area is higher than the ratio of inner fuel opening 231A-M surface area to inner coolant passage 241A-M surface area.

To summarize, in the depicted example of FIGS. 2A-E, the inner holes 261A-Z of the inner moderator matrix 121A are irregularly spaced with respect to the outer holes 262A-Z of the outer moderator matrix 121B such that an inner pattern of the inner holes 261A-Z is clustered more closely together compared to an outer pattern of the outer holes 262A-Z of the outer moderator matrix 121B. However, the nuclear reactor core 101 of FIGS. 1A-C is modified as follows. The inner pattern and the outer pattern have a variable hole size with respect to each other such that: (i) the inner coolant passages 241A-M are sized differently compared to the outer coolant passages 242A-M (see FIGS. 2B-C), (ii) the inner fuel openings 231A-M are sized differently compared to the outer fuel openings 232A-M (see FIGS. 2D-E), or a combination thereof.

Further, the variable hole size is a variable hole diameter. However, in other examples, variable hole size can be measured in terms of the inner hole 261A-Z or outer hole 262A-Z perimeter, circumference, diameter, depending on the shape of the inner holes 261A-Z or the outer holes 262A-Z. In the example, the inner holes 261A-Z and outer holes 262A-Z are circular-shaped openings, but the inner holes 261A-Z and outer holes 262A-Z can include other opening shapes, including polygonal opening shapes. Inner holes 261A-Z may have differently-shaped openings as compared to the outer holes 262A-Z, and the inner fuel openings 231A-M and outer fuel openings 232A-M may have differently-shaped openings as compared to the inner coolant passages 241A-M and outer coolant passages 242A-M. Inner holes 261A-Z and outer holes 262A-Z may have varying sizes extending from the opening of the inner holes 261A-Z and outer holes 262A-Z into the skewed-pin moderator block array 113. Each of the inner coolant passages 241A-M has an inner coolant passage size 243, and each of the outer coolant passages 242A-M has an outer coolant passage size 244. The outer coolant passage size 244 exceeds the inner coolant passage size 243. As depicted in FIG. 2D, the same or similar size calculation function can be applied to the inner fuel openings 231A-M and outer fuel openings 232A-M. Meaning, each of the inner fuel openings 231A-M has an inner fuel opening size 233, and each of the outer fuel openings 232A-M has an outer fuel opening size 234. The inner fuel opening size 233 exceeds the outer fuel opening size 234.

Figure 3A:
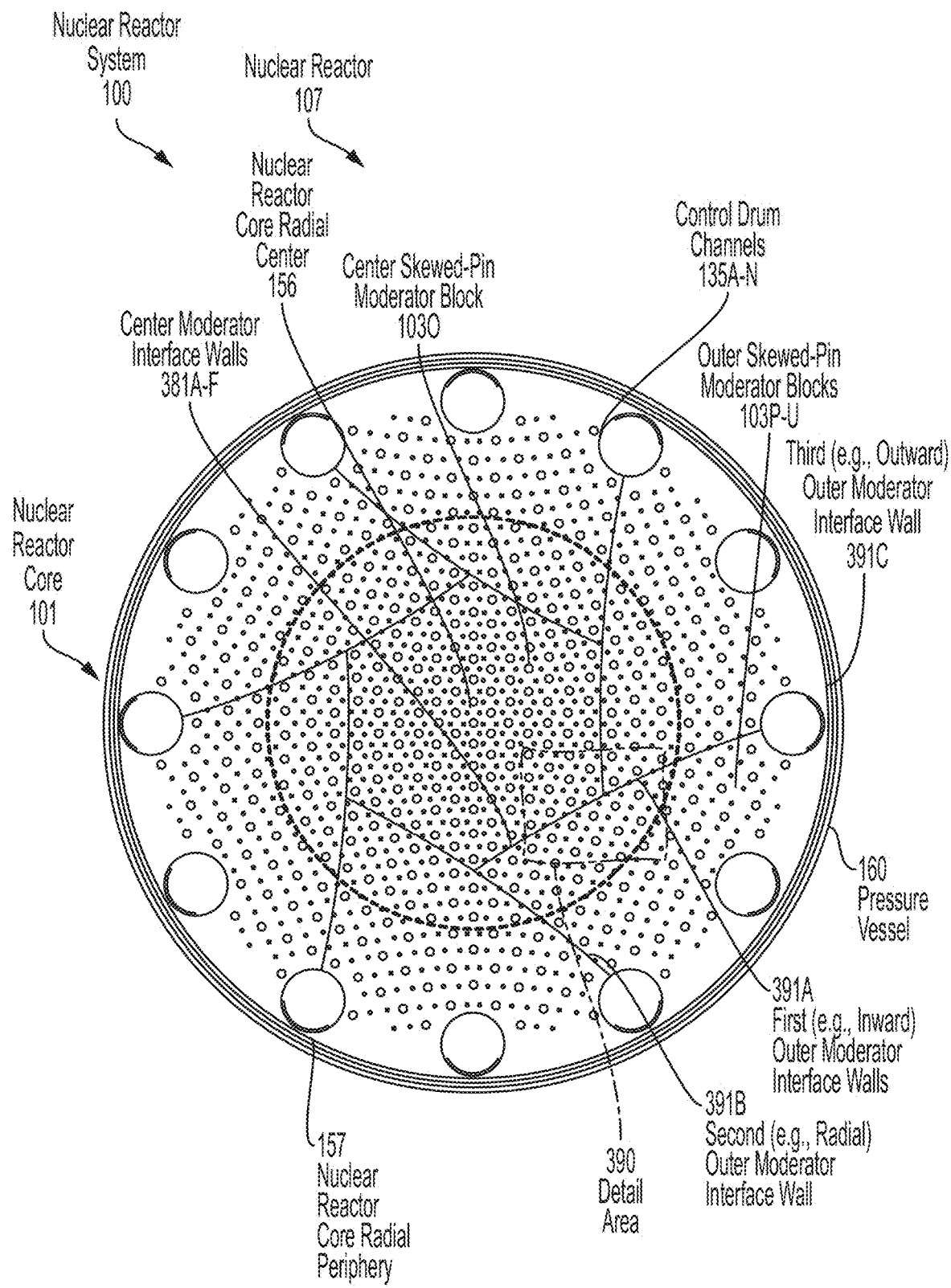
FIG. 3A is a cross-sectional view of a nuclear reactor core with a skewed-pin moderator block array from FIG. 1A, including tile cuts similar to hexagonal moderator blocks.

FIG. 3A is cross-sectional view of a nuclear reactor core 101 similar to FIG. 1A. However, the skewed-pin moderator block array 113 in FIG. 3A is not a monolithic, whole core, skewed-pin moderator block 103A, but is instead separately-cut, modular skewed-pin moderator blocks 1030-U that fit together as tiles, similar to regular hexagonal moderator blocks in traditional high-temperature gas reactors. In this particular example, thermomechanical analysis has shown that nuclear-grade graphite moderator blocks could be cut in the geometries show in FIG. 3A and withstand temperature gradients under irradiation for many years.

In FIG. 3A, the skewed-pin moderator blocks 1030-U are shaped as prisms, though they could also be shaped as cylinders as in FIGS. 1A-C and 2A-F. The center skewed-pin moderator block 1030 is generally shaped as a hexagonal prism or a hexagon when viewed from the longitudinal perspective of the nuclear reactor core 101. The remaining, outer skewed-pin moderator blocks 103P-U are generally shaped like a triangular prism or a triangle with rounded faces, when viewed from the longitudinal perspective of the nuclear reactor core 101. In this example, there is a single center skewed-pin moderator block 1030, but in some examples there can be a plurality of inner skewed-pin moderator blocks constituting the center skewed-pin moderator block 1030.

The center skewed-pin moderator block 1030 includes a plurality of center moderator interface walls 381A-F equal to the number of outer skewed-pin moderator blocks 103P-U, in this example six, with the center moderator interface walls 381A-F bordering a respective outer skewed-pin moderator block 103P-U. The outer skewed-pin moderator blocks 103P-U each have three outer moderator interface walls 391A-C.

First, an outer skewed-pin moderator block 103P has a first (e.g., inward) outer moderator interface wall 391A, which borders a respective center moderator interface wall 381A, as well as a third outer moderator interface wall 391C of a neighboring outer skewed-pin moderator block 103Q. The first outer moderator interface wall 391A is slightly convex, and the central moderator interface wall 381A is slightly concave.

Second, the outer skewed-pin moderator block 103P has a second (e.g., radial) outer moderator interface wall 391B, which borders a first outer moderator interface wall 391A of a neighboring outer skewed-pin moderator block 103U. The second outer moderator interface wall 391B is slightly concave to accommodate the convex first outer moderator interface wall 391A of the neighboring outer skewed-pin moderator block 103U.

Third, the outer skewed-pin moderator block 103P has a third (e.g., outward) outer moderator interface wall 391C, which borders the pressure vessel 160 and faces away from the center skewed-pin moderator block 1030. The third outer moderator interface wall 391C is slightly concave, and is formed of spherical or aspherical surface(s). As shown, in FIGS. 3A and 3E, the third outer moderator interface wall 391C includes three control drum channels 135A-C formed therein.

The center skewed-pin moderator block 1030 and outer skewed-pin moderator blocks 103P-U appear to an observer as a curved surface or a flat surface like a cut gemstone with many facets. A "facet" can be a flattened segment (e.g., planar surface) or curved segment (e.g., aspherical or spherical surface). The multiple third outer moderator interface walls 391C of the outer skewed-pin moderator blocks 103P-U can form a continuous (e.g. uniform or smooth) round (e.g., circular or oval) perimeter edge at the nuclear reactor core radial periphery 157. However the multiple third outer moderator interface walls 391C can also form a discontinuous (e.g., non-uniform or jagged) edge at the nuclear reactor core radial periphery 157 to accommodate filler elements of the optional reflector 140. As used herein "interface wall" can be formed of one facet (single faceted) like the third (e.g., outward) outer moderator interface wall 391C. Alternatively, the "interface wall" can be formed of multiple facets (multi-faceted) like the first (e.g., inward) outer moderator interface wall 391A and the second (e.g., radial) outer moderator interface wall 391B.

Figure 3B:
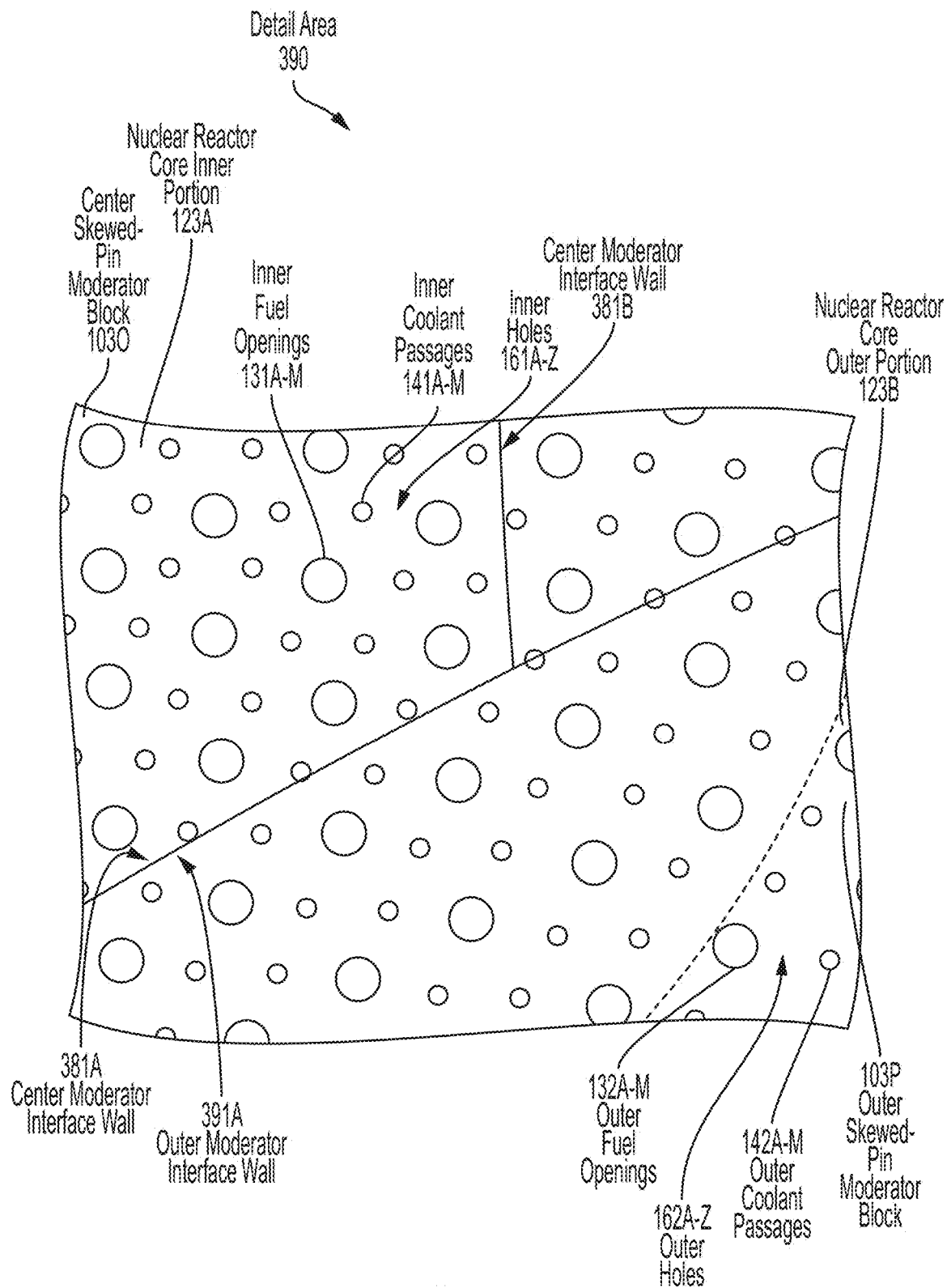
FIG. 3B is a zoomed-in view of the cross-section of the nuclear reactor core of FIG. 3A showing details of fuel openings and coolant passages.

FIG. 3B is a zoomed-in, cross-section view of the detail area 390 of the nuclear reactor core 101 of FIG. 3A, showing further details of the intersection between two outer skewed-pin moderator blocks 103P-Q and the center skewed-pin moderator block 1030. In particular, FIG. 3B illustrates that the structure of some of the inner holes 161A-Z and outer holes 162A-Z can be interrupted (e.g., bisected) by the center moderator interface wall 381A shown, or the first outer moderator interface wall 391A and second outer moderator interface wall 391B depicted. Additionally, FIG. 3B shows that the center moderator interface walls 381A-F and the outer moderator interface walls 391A-C extend through the skewed-pin moderator block array 113.

In the depicted example of FIGS. 3A-E, the center skewed-pin moderator block 1030 only includes inner holes 161A-Z, where a first subset of inner holes 161A-T are formed therein. The outer skewed-pin moderator blocks 103P-U include a second subset of inner holes 161U-Z and the outer holes 162A-Z formed therein. Hence, in the first example, the inner holes 161A-Z are not all within the center skewed-pin moderator block 1030, and the outer skewed-pin moderator blocks 103P-U do not only contain outer holes 162A-Z. Although not shown, in a second example, the center skewed-pin moderator block 1030 can include both inner holes 161A-Z and a first subset of outer holes 162A-F formed therein. The outer skewed-pin moderator blocks 103P-U only include outer holes 162G-Z formed therein. In a third example, the center skewed-pin moderator block 1030 can include the entirety of the inner moderator matrix 121A formed therein. The outer skewed-pin moderator blocks 103P-U can include the entirety of the outer moderator matrix 121B formed therein, and thereby can demarcate differences in population density and size between inner holes 161A-Z formed exclusively within the center skewed-pin moderator block 1030 and outer holes 162A-Z formed exclusively within the outer skewed-pin moderator blocks 103P-U. In a fourth example, the center skewed-pin moderator block 1030 can include both a first subset of inner holes 161A-T and a first subset of the outer holes 162A-F formed therein. The outer skewed-pin moderator blocks 103P-U can include both a second subset of inner holes 161U-Z and a second subset of outer holes 162G-Z formed therein.

Figure 3C:
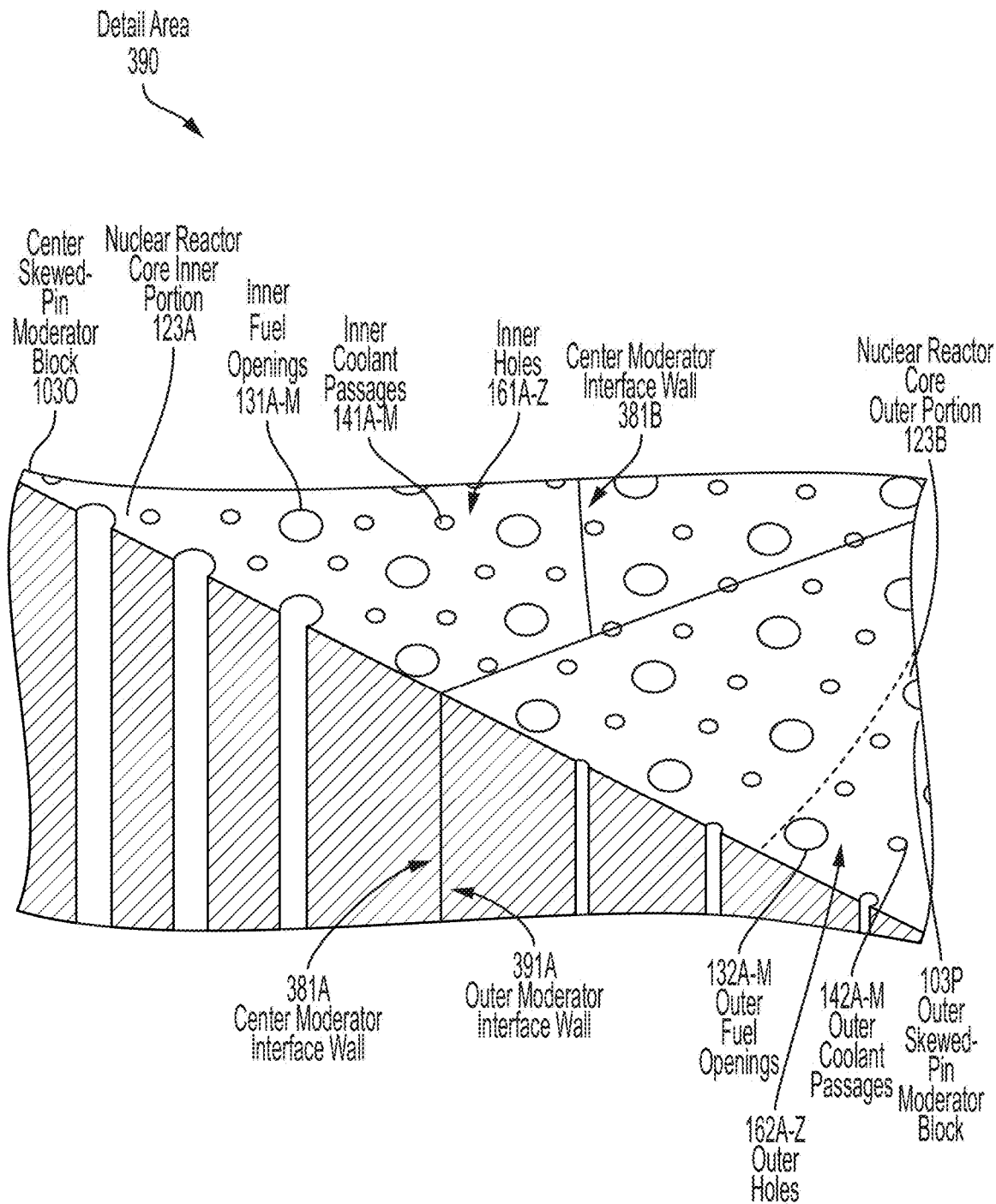
FIG. 3C is an isometric view of the zoomed-in detail view of the nuclear reactor core of FIG. 3B showing details of fuel openings and coolant passages.

FIG. 3C is an isometric view of the detail area 390 of the nuclear reactor core 101 of FIG. 3A, showing similar details to FIG. 3B. FIG. 3C further illustrates a cross-sectional view showing that the inner holes 161A-Z and outer holes 162A-Z extend from a respective upper surface of the skewed-pin moderator blocks 103P-U through the body of the skewed-pin moderator blocks 103P-U. Although not shown in the cross-section of FIG. 3C, it should be understood that inner holes 161A-Z and outer holes 162A-Z can be formed as facets of center moderator interface walls 381A-F and/or outer moderator interface walls 391A-C.

In sum, in the depicted example of FIGS. 3A-C, the one or more skewed-pin moderator blocks 1030-U is shaped as a prism or a cylinder; however, the prism or the cylinder can include multiple facets. The inner holes 161A-Z are clustered more closely together such that an inner hole spacing between the inner holes 161A-Z of the inner moderator matrix 121A is smaller compared to an outer hole spacing between the outer holes 162A-Z of the outer moderator matrix 121B. The skewed-pin moderator block array 113 includes one or more inner or center skewed-pin moderator blocks 1030 with the inner pattern and positioned in the nuclear reactor core inner portion 123A, and one or more outer skewed-pin moderator blocks 103P-U with the outer pattern and positioned in the nuclear reactor core outer portion 123B to surround the one or more inner or center skewed-pin moderator blocks 1030.

In FIGS. 3A-C, the one or more inner skewed-pin moderator blocks 1030-U includes a center skewed-pin moderator block 1030 surrounded by a plurality of outer skewed-pin moderator blocks 103P-U. The center skewed-pin moderator block 1030 includes a plurality of center moderator interface walls 381A-F. A respective center moderator interface wall 381A borders a respective outer skewed-pin moderator block 103P-U. The center skewed-pin moderator block 1030 is shaped as a polygonal prism and the respective outer skewed-pin moderator block 103P-U is shaped as a triangular prism. However, the polygonal prism or the triangular prism can include multiple facets. The respective outer skewed-pin moderator block 103P includes a plurality of outer moderator interface walls 391A-C. The center moderator interface walls 381A-F and the outer moderator interface walls 391A-C are planar, aspherical, spherical, or freeform surfaces. As used herein, a "freeform surface" does not have rigid radial dimensions, unlike regular surfaces, such as a planar surface; or an aspherical or spherical surface (e.g., cylinder, conical, quadric surfaces).

The plurality of outer moderator interface walls 391A-C include an inward or first outer moderator interface wall 391A. Part of the first outer moderator interface wall 391A interfaces with a respective center moderator interface wall 381A-F. The plurality of outer moderator interface walls 391A-C further include a radial or second outer moderator interface wall 391B. Part of the second outer moderator interface wall 391B interfaces with another outer skewed-pin moderator block 103Q. The plurality of outer moderator interface walls 391A-C further include an outward or third outer moderator interface wall 391B. Part of the outer moderator interface walls 391A-B includes control drum channels 135A-B to interface with control drums 115A-B.

Figure 3D:
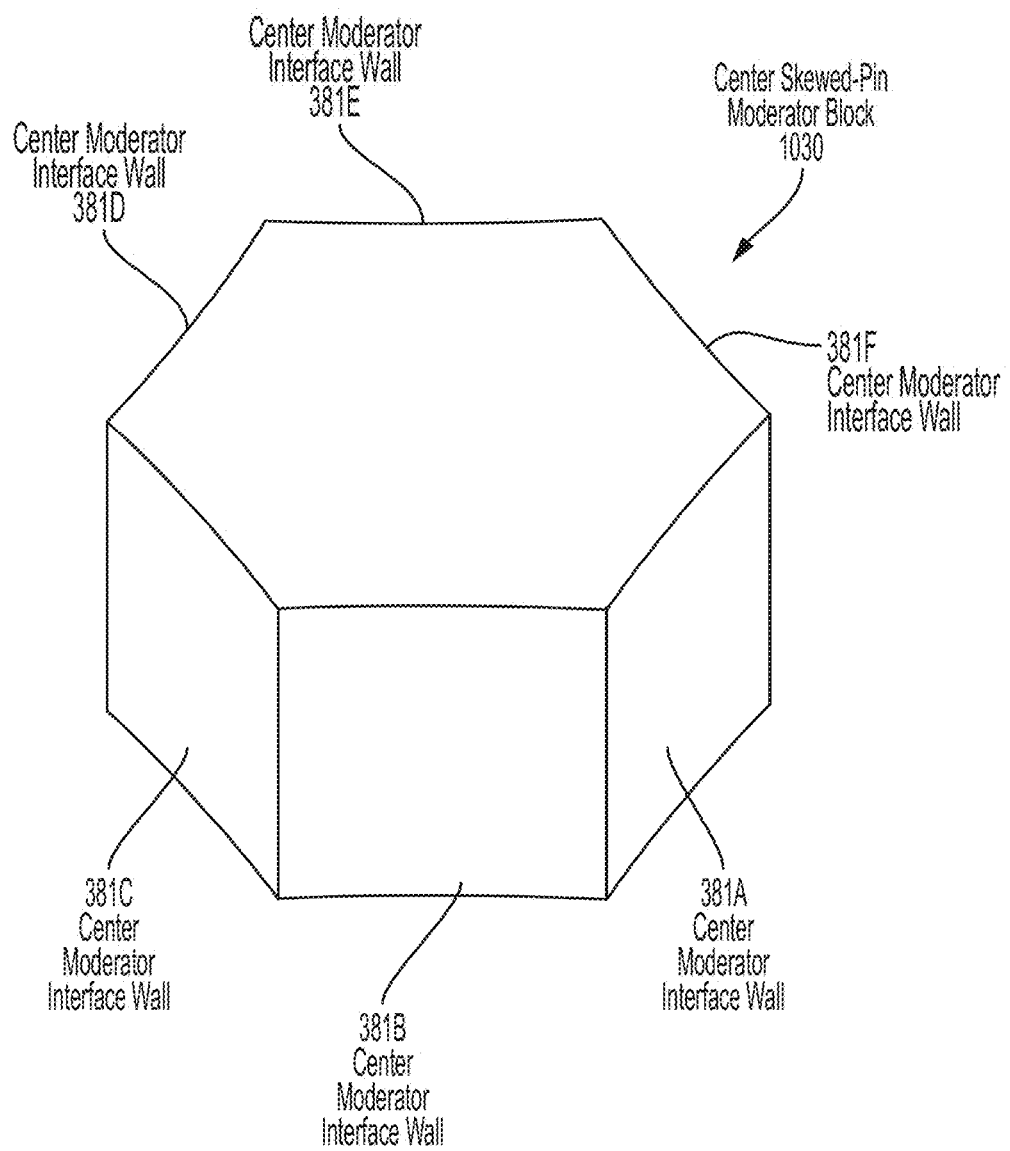
FIG. 3D is an isometric view of the center skewed-pin moderator block shown in isolation from the outer skewed-pin moderator blocks.

FIG. 3D is an isometric view of the center skewed-pin moderator block 1030 shown in isolation from the outer skewed-pin moderator blocks 103P-U. For ease of illustration, the inner holes 161A-Z, such as inner fuel openings 131A-M and inner coolant passages 141A-M, are not shown in FIG. 3D.

Figure 3E:
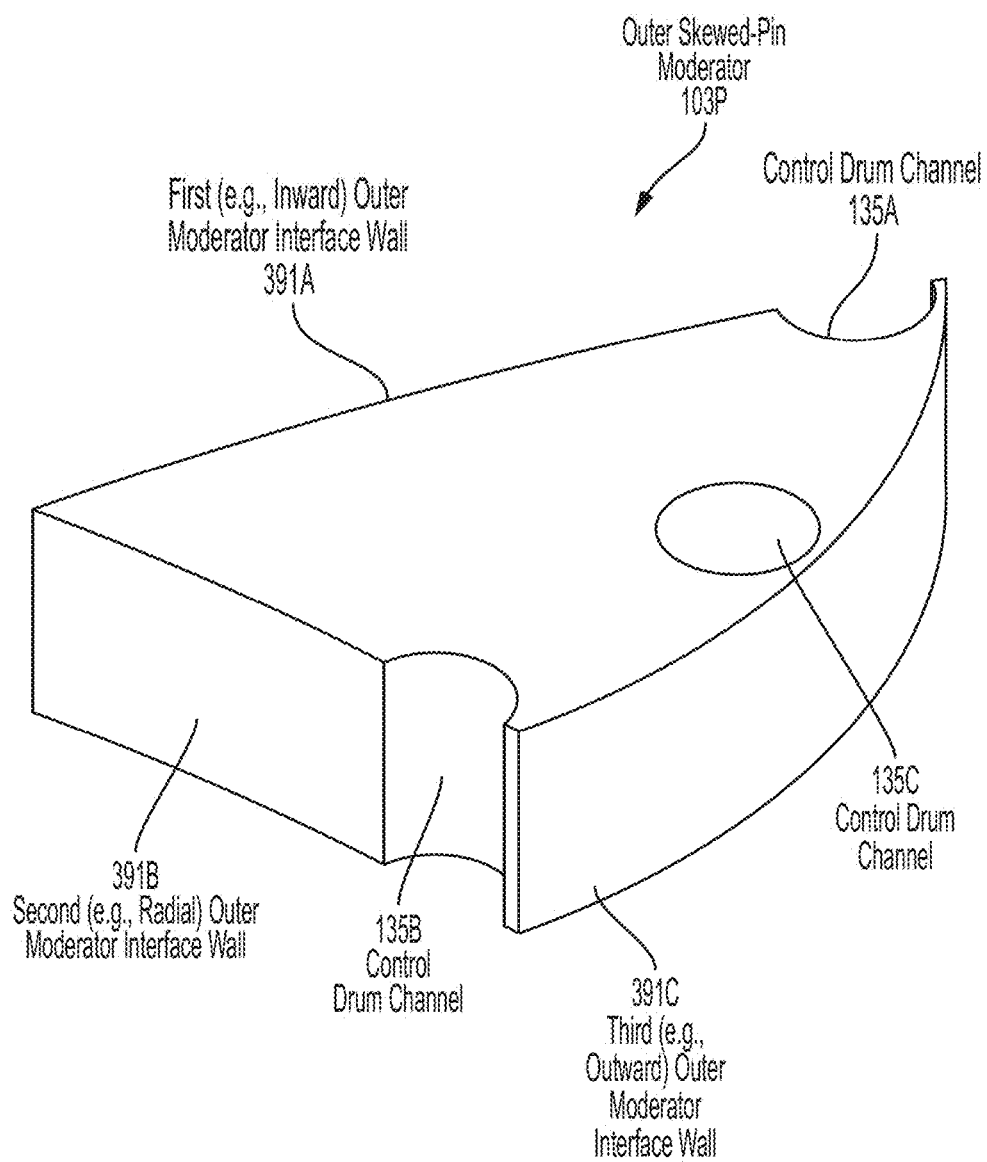
FIG. 3E is an isometric view of the outer skewed-pin moderator block shown in isolation from the center skewed-pin moderator block.

FIG. 3E is an isometric view of the outer skewed-pin moderator block 103P shown in isolation from the center skewed-pin moderator block 1030. For ease of illustration, no inner holes 161A-Z and outer holes 162A-Z, such as outer fuel openings 132A-M and outer coolant passages 142A-M, are shown in FIG. 3E. The first outer moderator interface wall 391A includes a control drum channel 135A formed therein as a spherical surface. The second outer moderator interface wall 391B also includes a second control drum channel 135B formed therein as a spherical surface. A third control drum channel 135C is formed near the third outer moderator interface wall 391C in the outer skewed-pin moderator block 103P. Although not shown in FIGS. 3D-E, facets that can be formed for inner holes 161A-Z and/or outer holes 162A-Z in both a center moderator interface walls 381A-C and an outer moderator interface walls 391A-C.

Figure 4A:
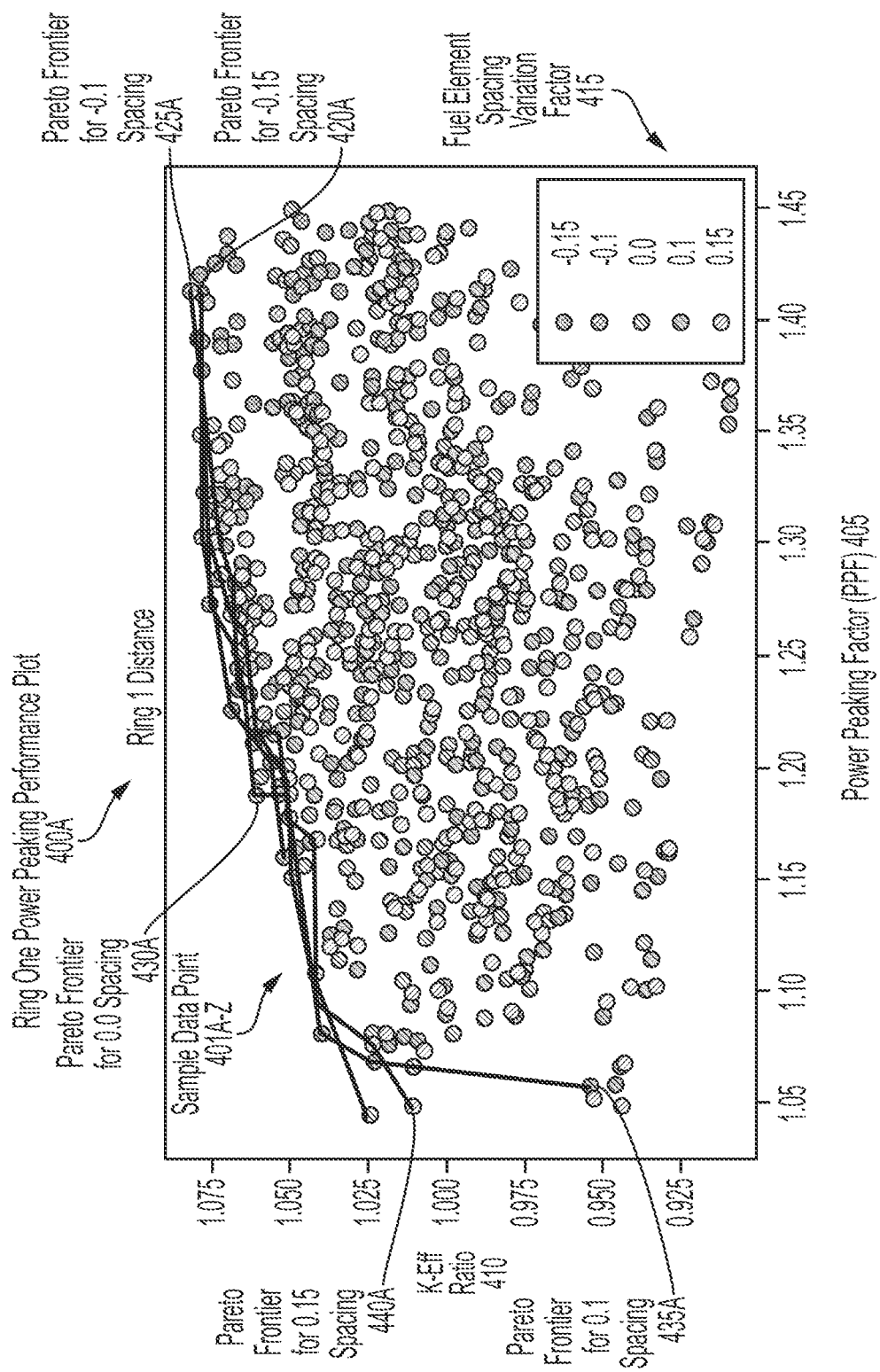
FIGS. 4A-F are scatterplots depicting an example nuclear reactor core design space where Pareto frontier lines depict how changes in radial spacing of fuel openings in combination with other factors can affect the power peaking factor and k-effective (k-eff) ratios of the example nuclear reactor core.
Figure 4B:
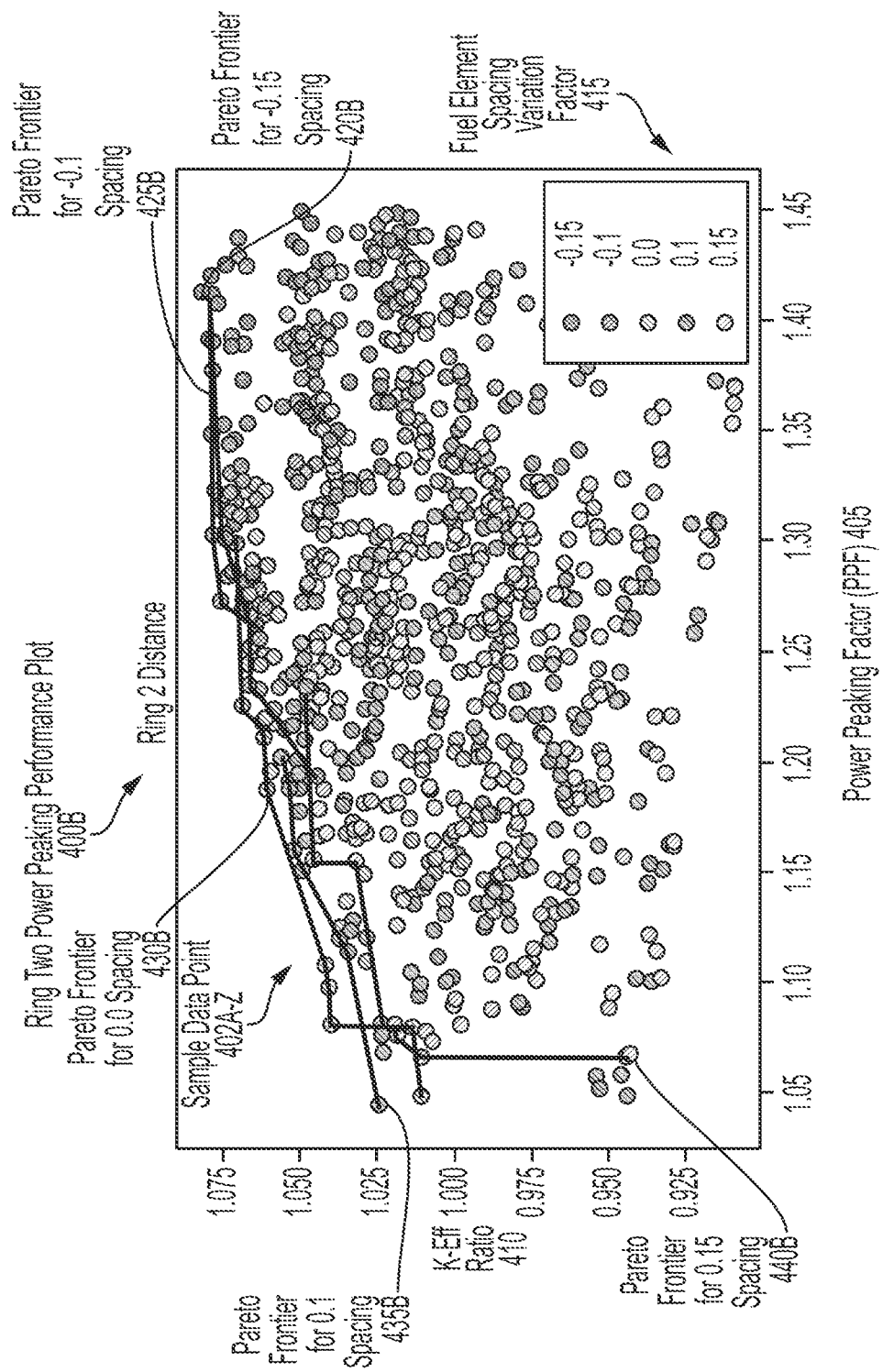
Figure 4C:
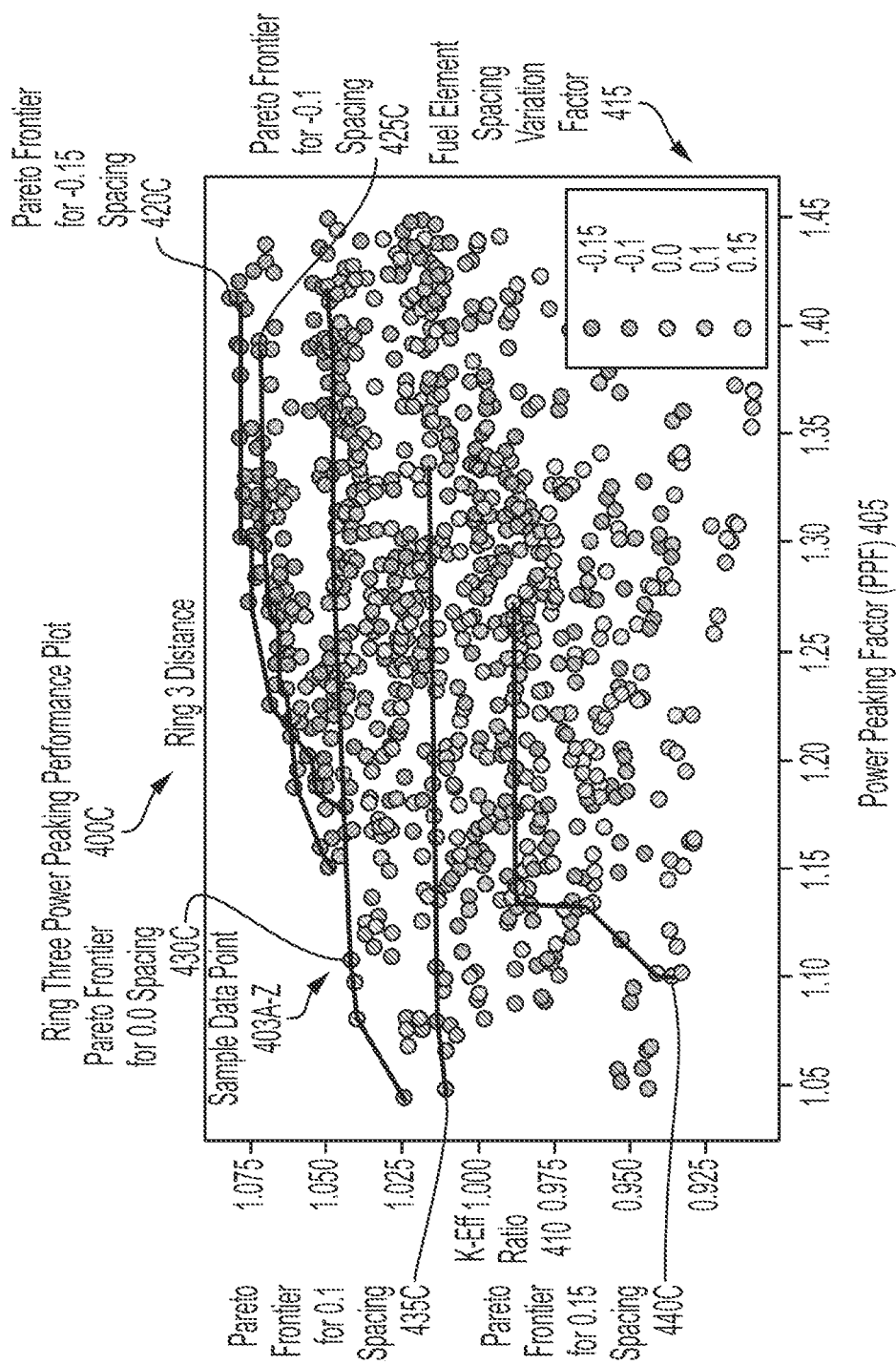
Figure 4D:
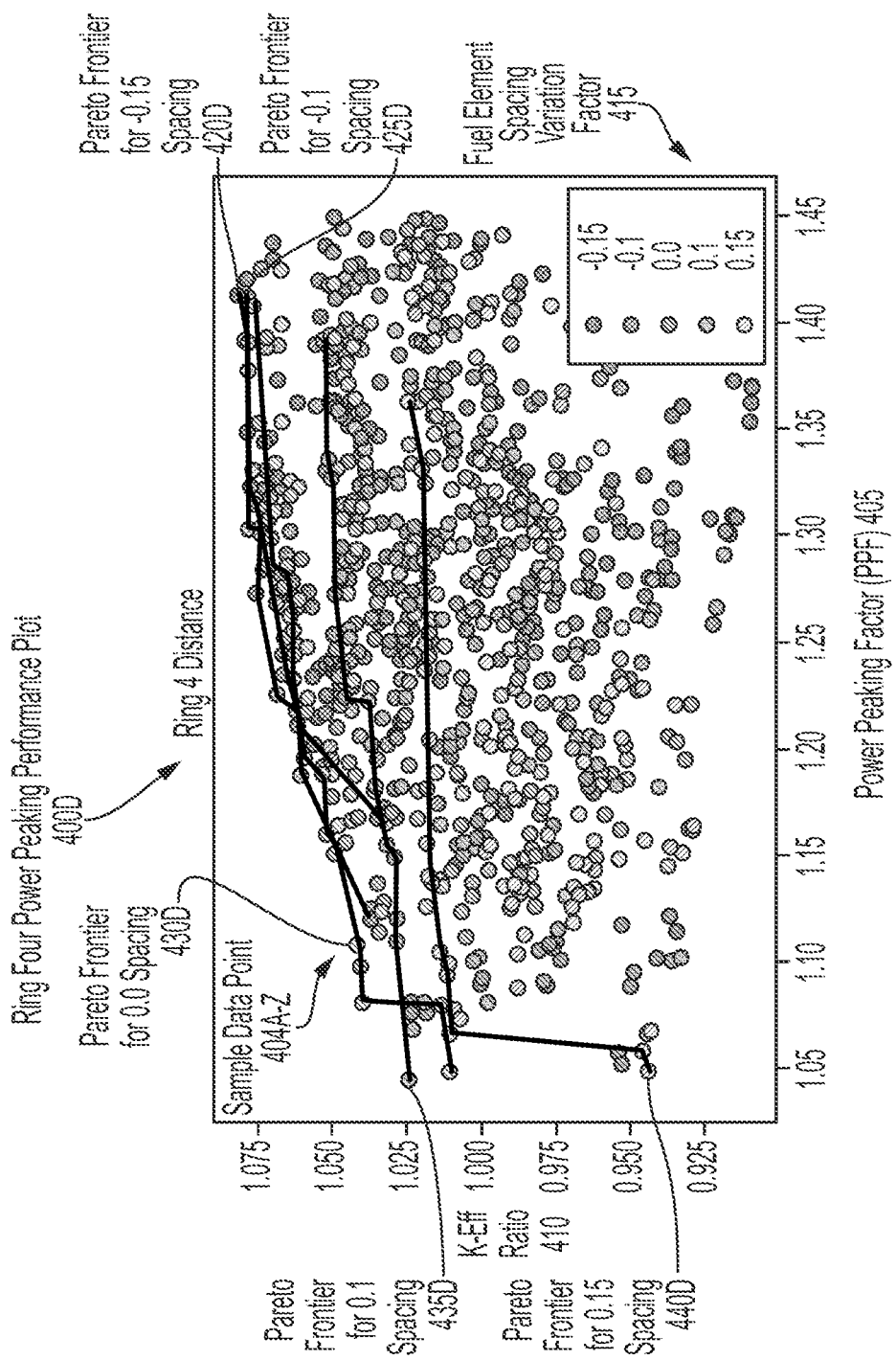
Figure 4E:
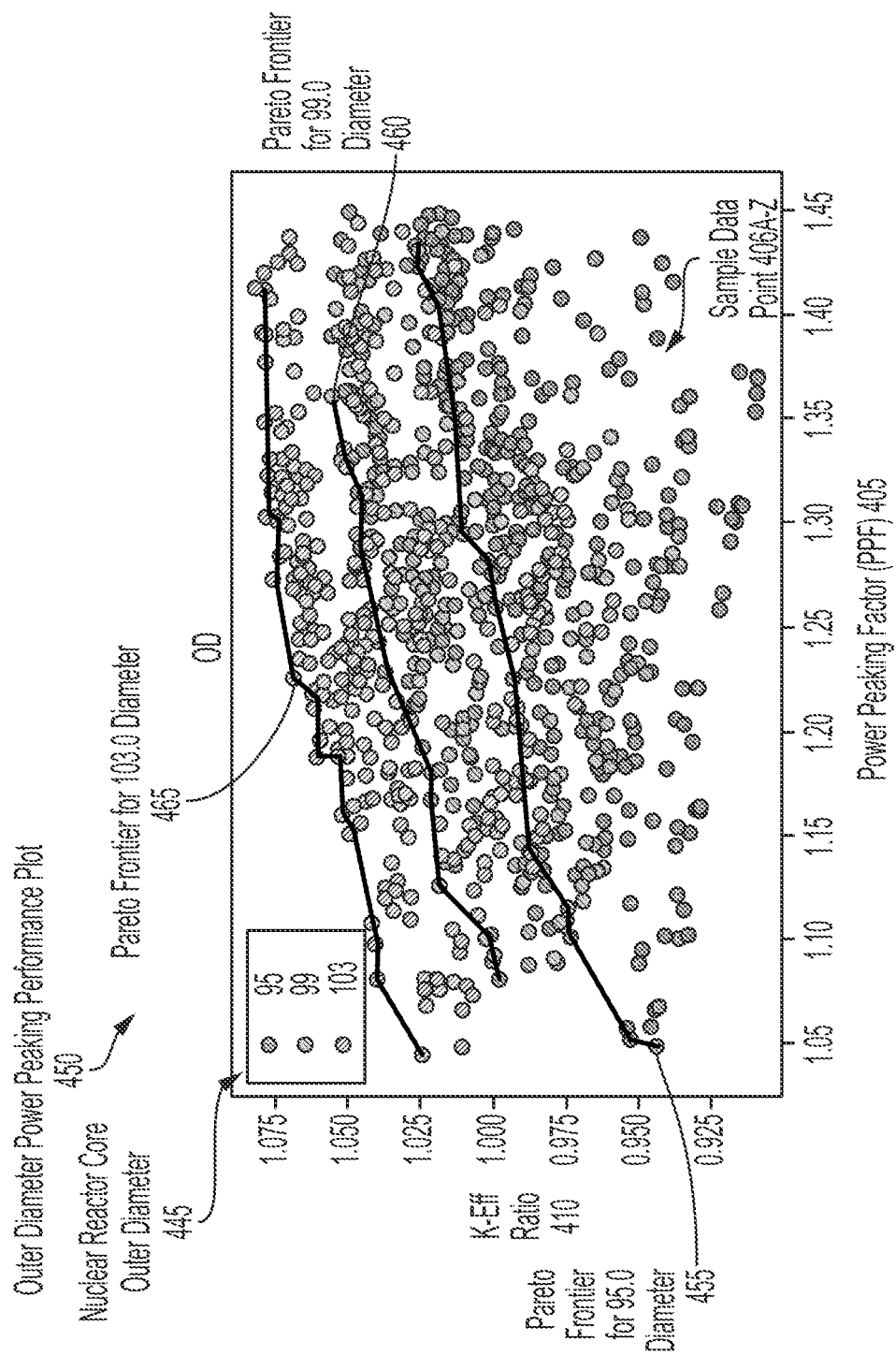
Figure 4F:
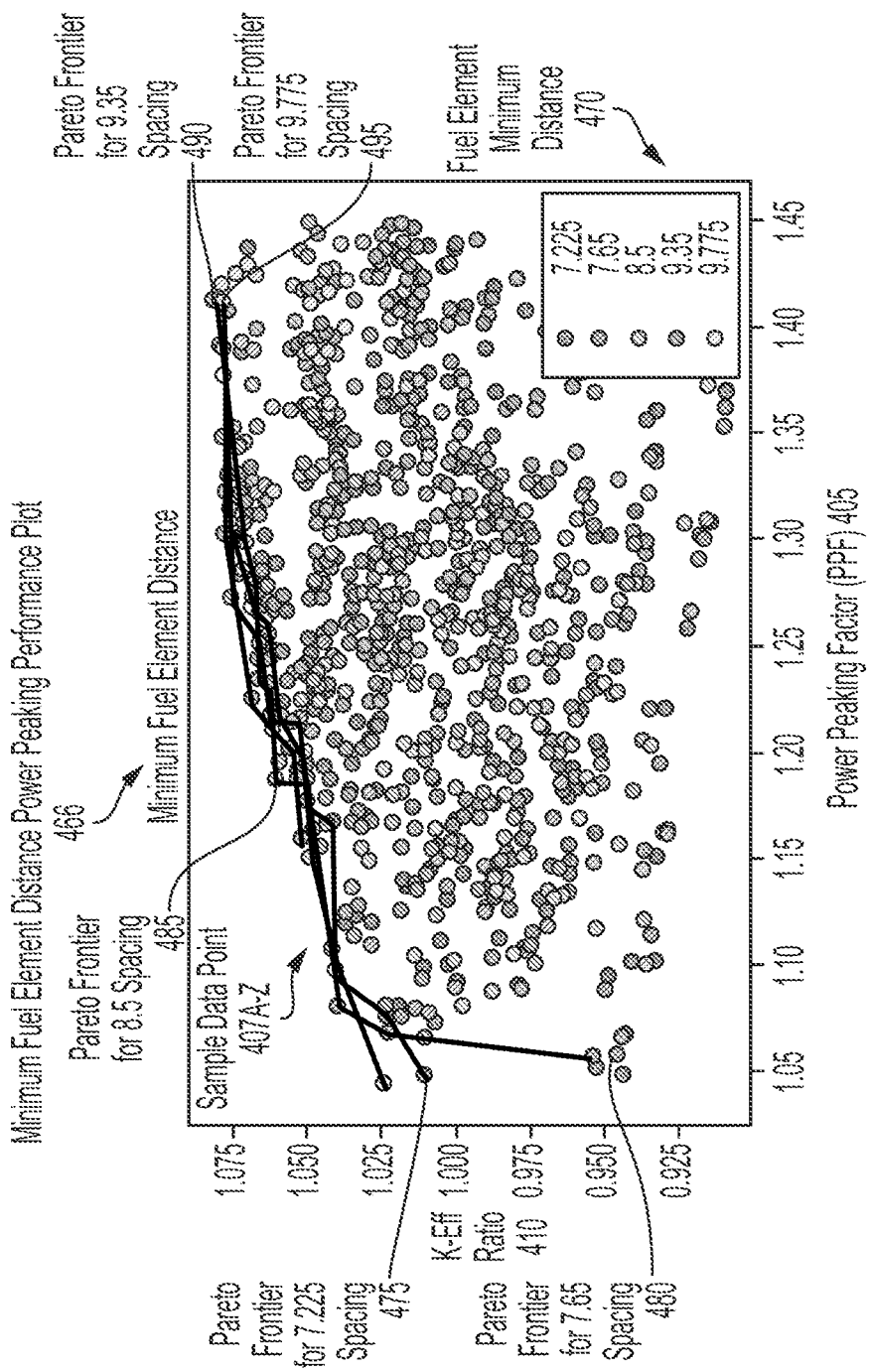

FIGS. 4A-F are scatterplots examining trends in an example design space for a nuclear reactor core 101 of a nuclear reactor 107 for NTP. Highlighted trends in the FIGS. 4A-F scatterplots depict how changes in radial spacing in combination with other factors can minimize radial peaking while maintain a sufficiently high k-effective (k-eff) ratio. All plotted design data points 401A-Z of FIG. 4A, 402A-Z of FIG. 4B, 403A-Z of FIG. 4C, 404A-Z of FIG. 4D, 406A-Z of FIG. 4E, and 407A-Z of FIG. 4F, represent a configuration of a nuclear thermal propulsion system nuclear reactor 107 comprising four rings of inner fuel openings 131A-M and outer fuel openings 132A-M. These design points were produced in a combinatoric manner, where every valid combination of ring one 525 of FIGS. 5A-D fuel element spacing variation factor, ring two 530 of FIGS. 5A-D fuel element spacing variation factor, ring three 535 of FIGS. 5A-D fuel element spacing variation factor, ring four 540 of FIGS. 5A-D, nuclear reactor 107 outer diameter, and minimum fuel element distance were produced. To reiterate, each figure in FIGS. 4A-F has the same design points, but different trends are highlighted.

FIGS. 4A-F sort these large numbers of design data points 401A-Z, 402A-Z, 403A-Z, 404A-Z, 406A-Z, 407A-Z by k-effective ratio 410 and power peaking factor 405 space. Design points with high k-effective ratio 410 and low power peaking factor 405 are desired in this design space. A k-effective ratio 405 greater than 1.000 is required for the nuclear reactor 107 to operate, and a k-effective ratio 405 above 1.000 allows for more margin in design uncertainty, or allows for a nuclear reactor 107 to achieve a higher burn up of fissile material.

To reiterate, each figure in FIGS. 4A-F has the same design points but different trends are highlighted. The information in FIGS. 4A-F gives insight to engineers regarding the factors that influence optimal design points in the design space and lets engineers decide on an optimal design point that trades factors such as k-effective ratio, power peaking factor, outer core diameter, and minimum fuel element thickness.

More specifically, FIGS. 4A-D are scatterplots depicting the effect of varying a radial distance of inner fuel openings 131A-M and outer fuel openings 132A-M from the nuclear reactor core radial center 156 on a power peaking factor (PPF) at varying k-effective ratios in a nuclear reactor core 101. The coefficient k-effective (k-eff), also known as the neutron multiplication factor, characterizes the criticality state of the fissile material in the fuel particles suspended in the high-temperature matrix of the fuel elements 150A-N. Generally k-eff=number of neutrons produced/number of neutrons lost (through leakage or absorption). In the example of FIGS. 4A-D, the nuclear reactor core 101 includes an inner fuel opening 131A at center and four rings of surrounding inner fuel openings 131B-M and outer fuel openings 132A-M.

FIG. 4A includes the ring one power peaking performance plot 400A. Ring one 525 of FIGS. 5A-D are examples of ring orientations of inner fuel openings 131B-M. The ring one power peaking performance plot 400A is the performance plot for the innermost ring of inner fuel openings 131A-M of a four ring nuclear reactor core 101. Each design data point 401A-Z is a power peaking factor 405 measurement at a given k-effective ratio 410 and fuel element spacing variation factor 415. The power peaking factor 405 on the X-axis is the amount of power peaking experienced by the nuclear reactor core 101 at a given k-effective ratio 410, provided the fuel element spacing variation factor 415 used. The k-effective ratio 410 on the Y-axis is the effective neutron multiplication factor and is the ratio of neutrons creating fission to the number that do not create fission.

K-effective ratio 410 values less than 1.000 indicated subcritical configurations of a nuclear reactor 107, and that the nuclear reactor core 101 is cannot sustain the fission in the nuclear reactor core 101. K-effective ratio 410 values greater than 1.000 indicate configurations of a nuclear reactor 107 that are capable of achieving supercriticality, where the nuclear reactor core 101 is heating up and is generating greater amounts of fission. K-effective ratio 410 values at 1.000 indicate critical reactions, and that the nuclear reactor core 101 is stable and producing a constant amount of fission. A nuclear reactor core 101 will generally operate at a k-effective ratio 410 near 1.000, but may increase the k-effective ratio 410 when the nuclear reactor core 101 is increasing energy output, or decrease the k-effective ratio 410 when the nuclear reactor core 101 is decreasing energy output.

The fuel element spacing variation factor 415 is the increase or decrease in spacing variation from a conventional nuclear reactor core 101. For example, the 0.0 fuel element spacing variation factor 415 indicates a conventional nuclear reactor core 101 spacing. The −0.15 fuel element spacing variation factor indicates inner fuel elements 131A-M are spaced closer together in the tested nuclear reactor core 101 than the inner fuel elements of a conventional nuclear reactor core.

FIG. 4A therefore highlights the impact of fuel element spacing variation factor 415 on ring one 525. The Pareto frontier for each fuel element spacing variation factor is marked with a line. As an example set of design data points 401A-Z with a fuel element spacing variation factor of 0.15 have a Pareto frontier for 0.15 spacing 440A. The Pareto frontier indicates all design data points 401A-Z on the line have the lowest possible power peaking factor 405 without lowering the k-effective ratio 410 for a given a fuel element spacing variation factor 415.

Each of the five variants of the fuel element spacing variation factor 415 also have a maximum power peaking factor spacing line graph shown as Pareto frontiers. The fuel element spacing variation of −0.15 has the Pareto frontier for −0.15 spacing 420A line, for example. The Pareto frontier for −0.1 spacing 425A line, Pareto frontier for 0.0 spacing 430A line, Pareto frontier for 0.1 spacing 435A line, and Pareto frontier for 0.15 spacing 440A line are all depicted as well. These lines chart all the design data points 401A-Z having the lowest possible power peaking factor 405 without lowering the k-effective ratio 410 for a given a fuel element spacing variation factor 415. The Pareto frontiers are directly relevant because design data points 401A-Z with a high k-effective ratio and a low power peaking factor are desired.

The Pareto frontiers for spacing lines 420A, 425A, 430A, 435A, 440A, show marginal improvement when changing the inner fuel opening 131A-M spacing when within the first ring 525 of the nuclear reactor core 101. While design data points 401A-Z for the reduced fuel element spacing variation factor 415 of −0.15 tend to congregate near the higher k-effective ratios 410 and higher power peaking factor 405, while the design data points 401A-Z for the increased fuel element spacing variation factor 415 of 0.15 tend to congregate near the lower k-effective ratios 410 and lower power peaking factor 405, the Pareto frontier for 0.15 spacing 440A and Pareto frontier for −0.15 spacing 420A line are very similar. However, the Pareto frontier for −0.15 spacing 420A line has no values with a power peaking factor 405 under 1.15, whereas the Pareto frontier for 0.15 spacing 440A has no power peaking factors 405 with a power peaking factor 405 over 1.30.

FIG. 4B includes the ring two power peaking performance plot 400B, and highlights fuel element spacing variation factor 415 on ring two 530 of FIGS. 5A-D in the design space. Ring two 530 in FIGS. 5A-D are examples of ring orientations of inner fuel openings 131A-M. The ring two power peaking performance plot 400B is the performance plot for the second-innermost ring of inner fuel openings 131A-M of a four ring nuclear reactor core 101. The design data points 402A-Z are collected and represent similar data to the design data points 401A-Z from FIG. 4A. Design data points 402A-Z are directed to alterations of fuel element spacing variation factor 415 to the second ring 530 of the nuclear reactor core 101, not the first ring 525 graphed in the ring one power peaking performance plot 400A.

In FIG. 4B as compared to FIG. 4A, the Pareto frontiers for various spacing 420B, 425B, 430B, 435B, 440B overlap less, and depict more variation in power peaking factor 405 based on fuel element spacing variation factor. Pareto frontier for −0.15 spacing 420B line begins at 1.25 power peaking factor 405, and continues up to a power peaking factor 405 of 1.40. Alternatively, Pareto frontier for 0.15 spacing 440B shows a power peaking factor 405 range from 1.07 to 1.25. These design data points 402A-Z shows that increasing the fuel element spacing variation factor 415 decreases the Pareto frontier. Additionally, when looking across the ring two power peaking performance plot 400B at the k-effective ratio value 410 of 1.000, the design data points 402A-Z related to the greater fuel element spacing variation factors operate at the efficient k-effective ratio 410 of 1.000 at a generally lower power peaking factor 405. Design data points 402A-Z associated with a decreased fuel element spacing variation factor 415 of −0.1 are unable to operate at a power peaking factor less than 1.20.

FIG. 4C includes the ring three power peaking performance plot 400C, and highlights fuel element spacing variation factor 415 on ring three 535 of FIGS. 5A-D in the design space. Ring three 535 in FIGS. 5A-D are examples of ring orientations of outer fuel openings 132A-M. The ring three power peaking performance plot 400C is the performance plot for the second-outermost ring of outer fuel openings 132A-M of a four ring nuclear reactor core 101. The design data points 403A-Z are collected and represent similar data to the design data points 401A-Z from FIG. 4A. Design data points 403A-Z are directed to alterations of fuel element spacing variation factor 415 to the third ring 535 of the nuclear reactor core 101, not the first ring 525 graphed in the ring one power peaking performance plot 400A.

In FIG. 4C as compared to FIG. 4B, the Pareto frontier for various spacing 420C, 425C, 430C, 435C, 440C lines overlap even less, and depict clear delineation in power peaking factor 405 based on fuel element spacing variation factor 415. The Pareto frontier for 0.15 spacing 440C line depicts an increasing power peaking factor 405 without ever reaching a k-effective ratio 410 of 1.000. This can indicate that a fuel element spacing variation factor 415 of 0.15 is too great, as the outer fuel openings 132A-M cannot achieve criticality, and the nuclear reactor core 101 is unable to produce sustained energy output. Alternatively, the Pareto frontier for 0.1 spacing 435C line shows a fuel element spacing variation factor 415 of 0.1 causes the power peaking factor 405 to increase while the k-effective ratio remains slightly above 1.000. This indicates that the spacing variation factor 415 of 0.1 is somewhat efficient, as operating the nuclear reactor core 101 with this spacing configuration at a sustainable k-effective ratio of 1.000 may not increase the power peaking factor 405 if the nuclear reactor core 101 is run properly. In other words, the power peaking factor 405 does not affect the k-effective ratio 410 for the design data points 403A-Z on the Pareto frontier for 0.1 spacing 435C.

FIG. 4D includes the ring four power peaking performance plot 400D and highlights the impact of fuel element spacing variation factor 415 on ring four 540, which is also the effective nuclear reactor core 101 outer diameter in the design space. Ring four 540 of FIGS. 5A-D are examples of ring orientations of outer fuel openings 132A-M. The ring four power peaking performance plot 400D is the performance plot for the outermost ring of outer fuel openings 132A-M of a four ring nuclear reactor core 101. The design data points 404A-Z are collected and represent similar data to the design data points 401A-Z from FIG. 4A. Design data points 403A-Z are directed to alterations of fuel element spacing variation factor 415 to the fourth ring 540 of the nuclear reactor core 101, not the first ring 525 graphed in the ring one power peaking performance plot 400A. In FIG. 4D as compared to FIG. 4A, the Pareto frontier for various spacing 420C, 425C, 430C, 435C, 440C lines overlap minimally, and depict clear delineation in power peaking factor 405 based on fuel element spacing variation factor 415. In particular, the Pareto frontier for 0.15 spacing 440D line depicts that there are several spacing configurations with a k-effective ratio 410 near 1.000, much like the Pareto frontier for 0.1 spacing 435C in FIG. 4C.

FIG. 4E is a scatterplot depicting the effect of radial distance manipulation of inner fuel openings 131A-M and outer fuel openings 132A-M on the power peaking factor at varying k-effective ratios in a nuclear reactor core 101 with a center fuel opening 131A and four rings of surrounding inner fuel openings 131B-G and outer fuel openings 132A-M. FIG. 4E includes the outer diameter power peaking performance plot 450, which is the performance plot for the nuclear reactor core 101 with varying outer diameters. Each design data point 406A-Z is a power peaking factor 405 measurement at a given K-effective ratio 410 and nuclear reactor core outer diameter 445. The nuclear reactor core outer diameter 445 is the diameter of the nuclear reactor core 101.

Each of the three variants of the nuclear reactor core outer diameter 445 also have a Pareto frontier spacing line graph. The nuclear reactor core outer diameter 445 of 95.0 has the Pareto frontier for 95.0 diameter 455 line, for example. The Pareto frontier for 99.0 diameter 460 line, and Pareto frontier for 103.0 diameter 465 line are all depicted as well.

The outer diameter power peaking performance plot 450 generally depicts that an increased nuclear reactor core outer diameter 445 allows for a higher k-effective ratio 410 for a given power peaking factor 405. None of the nuclear reactor core 101 configurations with a 95.0 diameter can even reach a k-effective ratio of 1.000 until it operates at a power peaking factor of 1.30. Alternatively, some nuclear reactor cores 101 with a 103.0 diameter can operate at a k-effective ratio over 1.000 without experiencing a power peaking factor 405 over 1.05.

FIG. 4F is a scatterplot depicting the effect radial distance manipulation of inner fuel openings 131A-M and outer fuel openings 132A-M has on power peaking factor at varying k-effective ratios in a nuclear reactor core 101 with a center fuel opening 131A and four rings of surrounding inner fuel openings 131B-M and outer fuel openings 132A-M. FIG. 4F includes the minimum fuel element distance power peaking performance plot 466, which is the performance plot for the nuclear reactor core 101 with varying minimum fuel element distances. The fuel element minimum distance 470 is the minimum distance between any two inner fuel openings 131A-M or outer fuel openings 132A-M in the nuclear reactor core 101. Each design data point 406A-Z is a power peaking factor 405 measurement at a given k-effective ratio 410 and fuel element minimum distance 470.

Each of the five variants of the fuel element minimum distance 470 also have a Pareto frontier spacing line graph. The fuel element minimum distance 470 of 7.225 has the Pareto frontier for 7.225 spacing 475 line, for example. The Pareto frontier for 7.65 spacing 480 line, Pareto frontier for 8.5 spacing 485 line, Pareto frontier for 9.35 spacing 490 line, and Pareto frontier for 9.775 spacing 495 line are all depicted as well.

The Pareto frontiers for spacing lines 475, 480, 485, 490, 495, show marginal improvement when changing the minimum distance between inner fuel opening 131A-M and outer fuel opening 132A-M spacing within the nuclear reactor core 101. Design data points for the reduced fuel element minimum distance 770 of 7.225 tend to congregate near the higher k-effective ratios 410 and higher power peaking factor 405. While the design data points for the increased fuel element minimum distance 470 of 9.775 tend to congregate near the lower k-effective ratios 410 and lower power peaking factor 405, the Pareto frontier for 7.225 spacing 475 and Pareto frontier for 9.775 spacing 420A line are very similar. Overall, the minimum fuel element distance power peaking performance plot 466 depicts that simple pure increases in fuel element minimum distance 470 do not translate to improved performance. A strategy targeting inner fuel openings 131A-M and outer fuel openings 132A-M as separate entities should be employed to see the performance improvements of FIGS. 4B-D. FIGS. 4A-F demonstrate that flattening the power profile can allow all fuel elements 150A-N to reach maximum operating temperature, raising the average outlet temperature of a nuclear reactor 107.

Figure 5A:
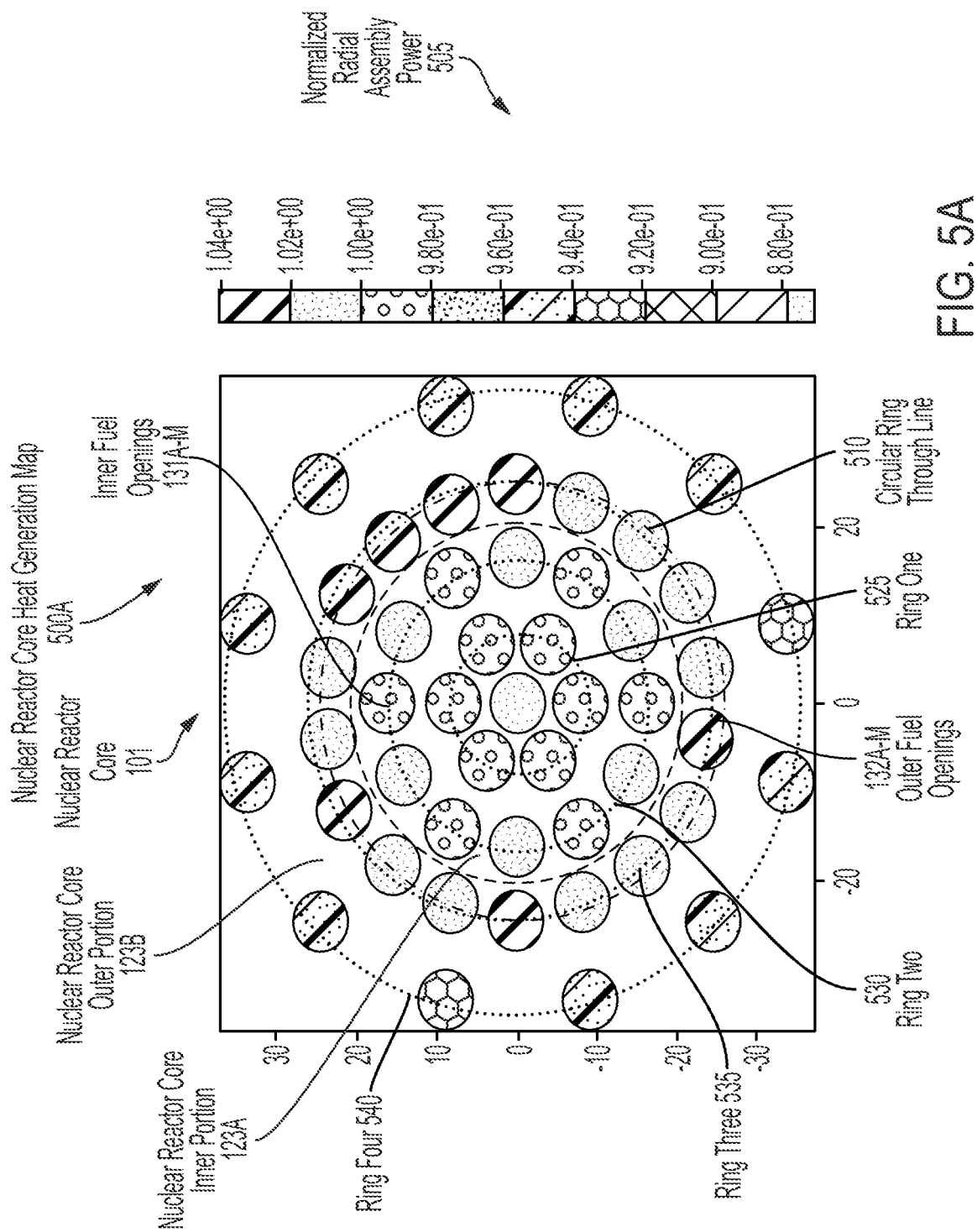
FIGS. 5A-D are heat generation map diagrams of different portions (parts) of a nuclear reactor core with four rings of fuel openings at a varying radial distances from the nuclear reactor core radial center.

FIG. 5A is a nuclear reactor core heat generation map 500A of different portions of a nuclear reactor core 101 with four rings 525, 530, 535, 540 of inner fuel openings 131A-M and outer fuel openings 132A-M at varying radial distances from the nuclear reactor core radial center 156. The normalized radial assembly power 505 depicts the amount of power, and therefore heat, being generated by a given inner fuel opening 131A-M or outer fuel openings 132A-M. FIG. 5A also depicts an atypical lateral geometry: off-grid spacing is implemented in order to place outer fuel openings 131A-M in a given ring 535 of the nuclear reactor core 101 on a circular ring through line 510. In the nuclear reactor core 101 of FIG. 5A, the inner three rings 525, 530, 535 of inner fuel openings 131A-M and outer fuel openings 132A-M have a substantially higher normalized radial assembly power 505 than the fourth outer ring 540 of outer fuel openings 132A-M.

Figure 5B:
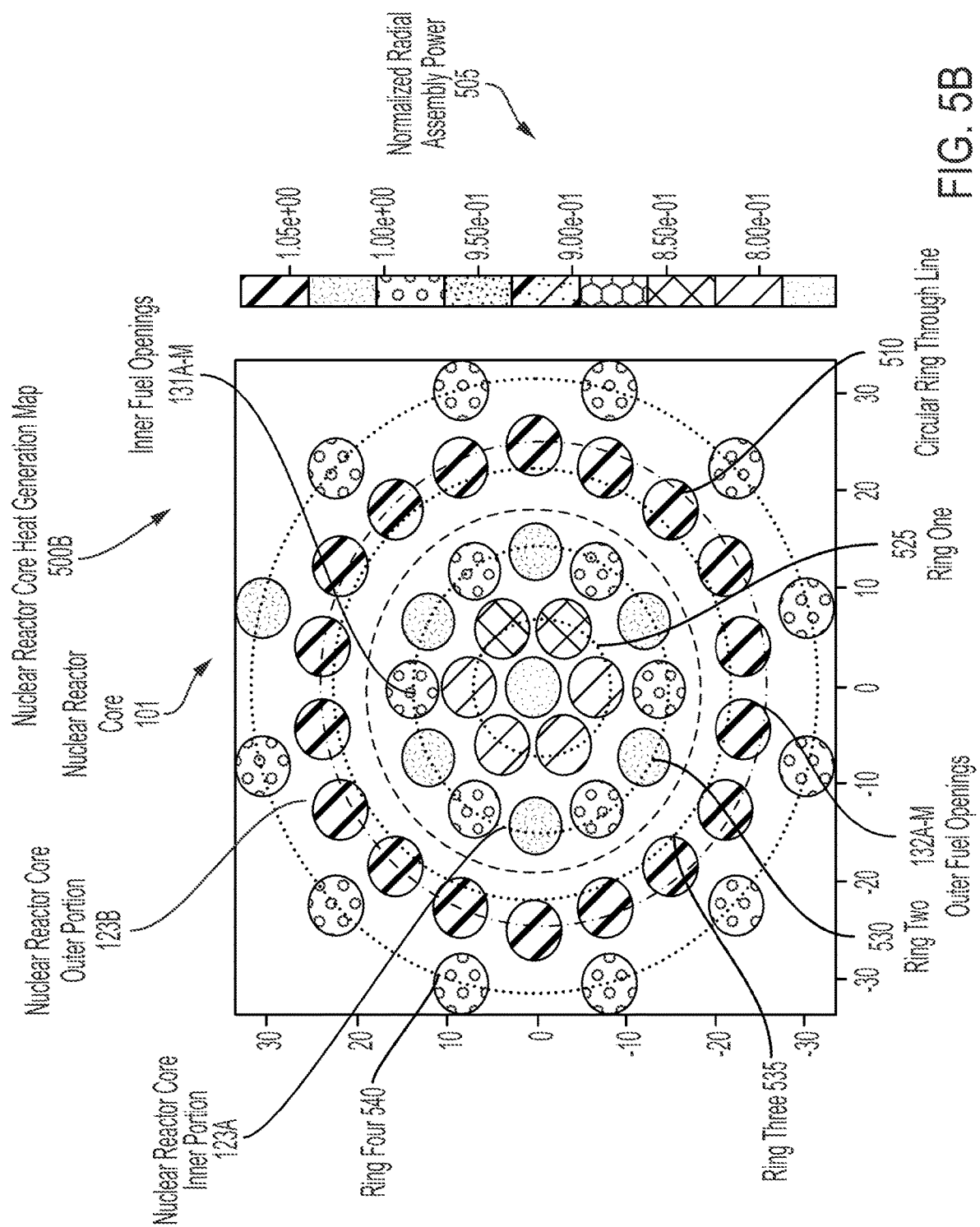

FIG. 5B shows a nuclear reactor core heat generation map 500B of different portions of a nuclear reactor core 101 that implements the skewed-pin moderator block array 113. In FIG. 5B, the nuclear reactor core 101 a subset or all of the inner fuel openings 131B-M are arranged as a circle shape or an oval shape, such as ring one 525 or ring two 530, in the nuclear reactor core inner portion 113A. The design of FIG. 5B is improved to separate the nuclear reactor core 101 into nuclear reactor core inner portion 113A or nuclear reactor core outer portion 113B and implements the skewed-pin moderator block array 113. The nuclear reactor core inner portion 113A, comprising two inner rings 525, 530 is more tightly packed in FIG. 5B compared to FIG. 5A, which can reduce the size of the nuclear reactor core 101. This design choice for the nuclear reactor core 101 of FIG. 5B is based on FIGS. 4A-B, which did not show appreciable performance improvement by increasing spacing between inner fuel openings 131A-M.

Furthermore, the nuclear reactor core outer portion 113B and outer fuel openings 132A-M are further from the nuclear reactor core inner portion 113A compared to FIG. 5A. This design choice for the nuclear reactor core 101 of FIG. 5B is based on FIGS. 4C-D, which showed improved performance when the third ring 535 of FIG. 4C is given more spacing than a conventional nuclear reactor core would provide. Additionally, the fourth ring 540 of outer fuel openings 132A-M is closer to the third ring 535 of outer fuel openings 132A-M, potentially overcoming any issue FIG. 4D presented with the fourth ring 540 being unable to reach a k-effective ratio 410 of at least 1.000.

Figure 5C:
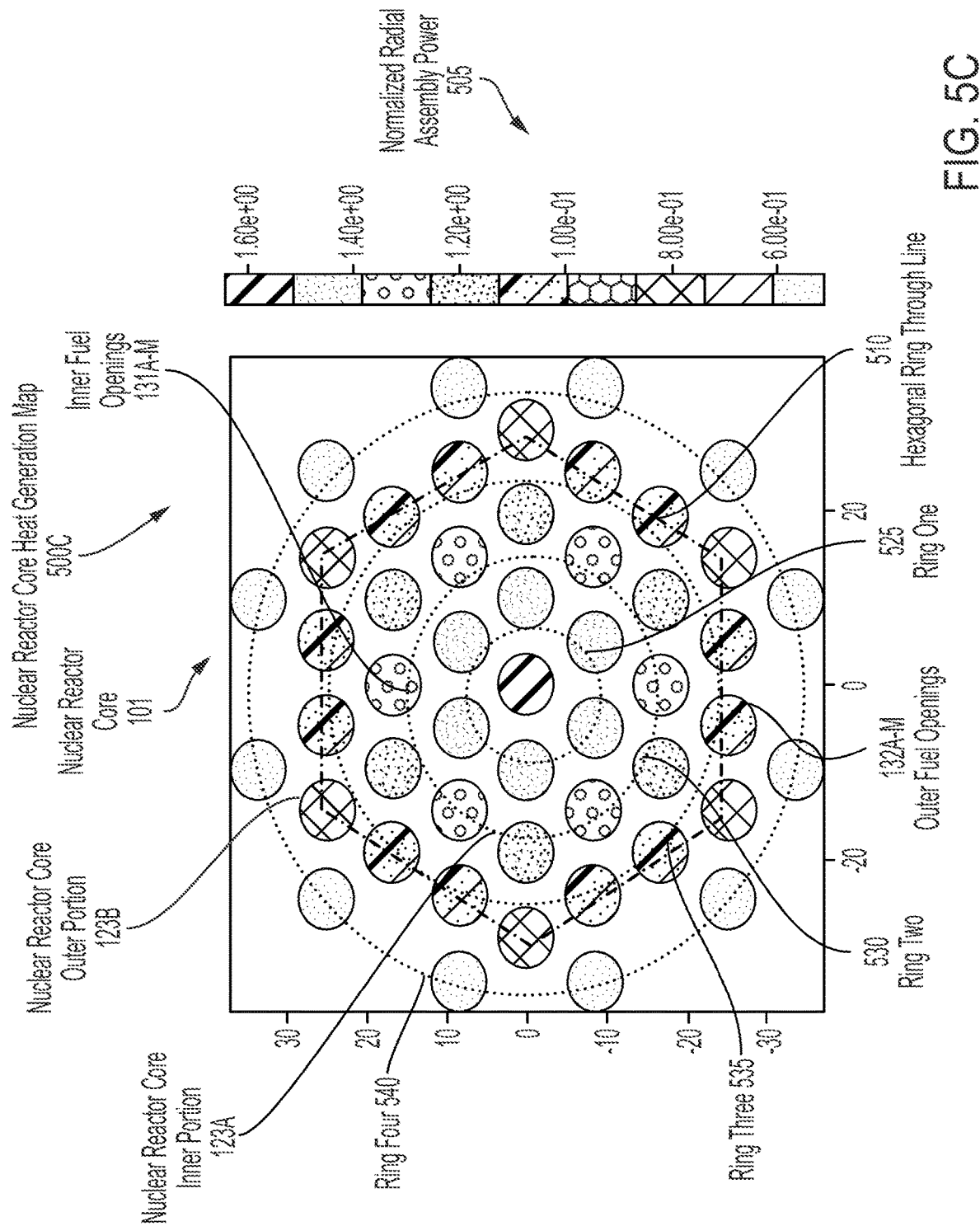

Overall, the nuclear reactor core 101 presented in FIG. 5B has reduced power peaking 405 and increased performance compared to the conventional design of FIG. 5C. In particular, the center of the nuclear reactor core inner portion 113A is actually generating less heat than the surrounding rings 525, 530, 535, 540, and power peaking at that nuclear reactor core radial center 156 is substantially reduced. Additionally, the normalized radial assembly power 505 of the nuclear reactor core outer portion 113B is increased, thereby making the outer fuel openings 132A-M, in particular those in the fourth ring 540, much more efficient.

Advantageously, in FIG. 5B, the implemented skewed-pin moderator block array 113 reduces the power peaking factor (PPF) by approximately 40% compared to the conventional nuclear reactor core design of FIG. 5C that implements uniform spacing. When the depicted off grid placement of fuel elements 151A-N are disposed inside the inner fuel openings 131A-M and the outer fuel openings 132A-M of the skewed-pin moderator block array 113 of FIG. 5B, power flattening of the nuclear reactor core 101 is achieved with minimal enrichment zoning or orificing.

FIG. 5C shows a nuclear reactor core heat generation map 500C of different portions of a conventional nuclear reactor core 101 with four rings 525, 530, 535, 540 of inner fuel openings 131A-M and outer fuel openings 132A-M. Conventionally, as shown in FIG. 5C, inner fuel openings 131A-M and outer fuel openings 132A-M are arranged hexagonally to increase the total amount of fuel openings per unit area. The spacing of holes is uniform (e.g. regularly spaced) throughout the conventional nuclear reactor core 101 of FIG. 5C. Hence, FIG. 5C does not implement the skewed-pin moderator block array 113, e.g., such that the nuclear reactor core 101 is divided into an inner moderator matrix 121A and an outer moderator matrix 121B.

Unlike FIGS. 5A-B, the nuclear reactor core 101 of FIG. 5C has a hexagonal ring though line 515 running through each of the four rings 525, 530, 535, 540 of the nuclear reactor core 101. This is a more conventional design than FIG. 5A, as placement of inner fuel openings 131A-M and outer fuel openings 132A-M can be spatially maximized in a hexagonal pattern. The inner fuel openings 131A-M closest to the nuclear reactor core radial center 156 have the highest normalized radial assembly power 505, and the outer fuel openings 132A-M closest to the nuclear reactor core radial periphery 157 have the lowest normalized radial assembly power 505.

Figure 5D:
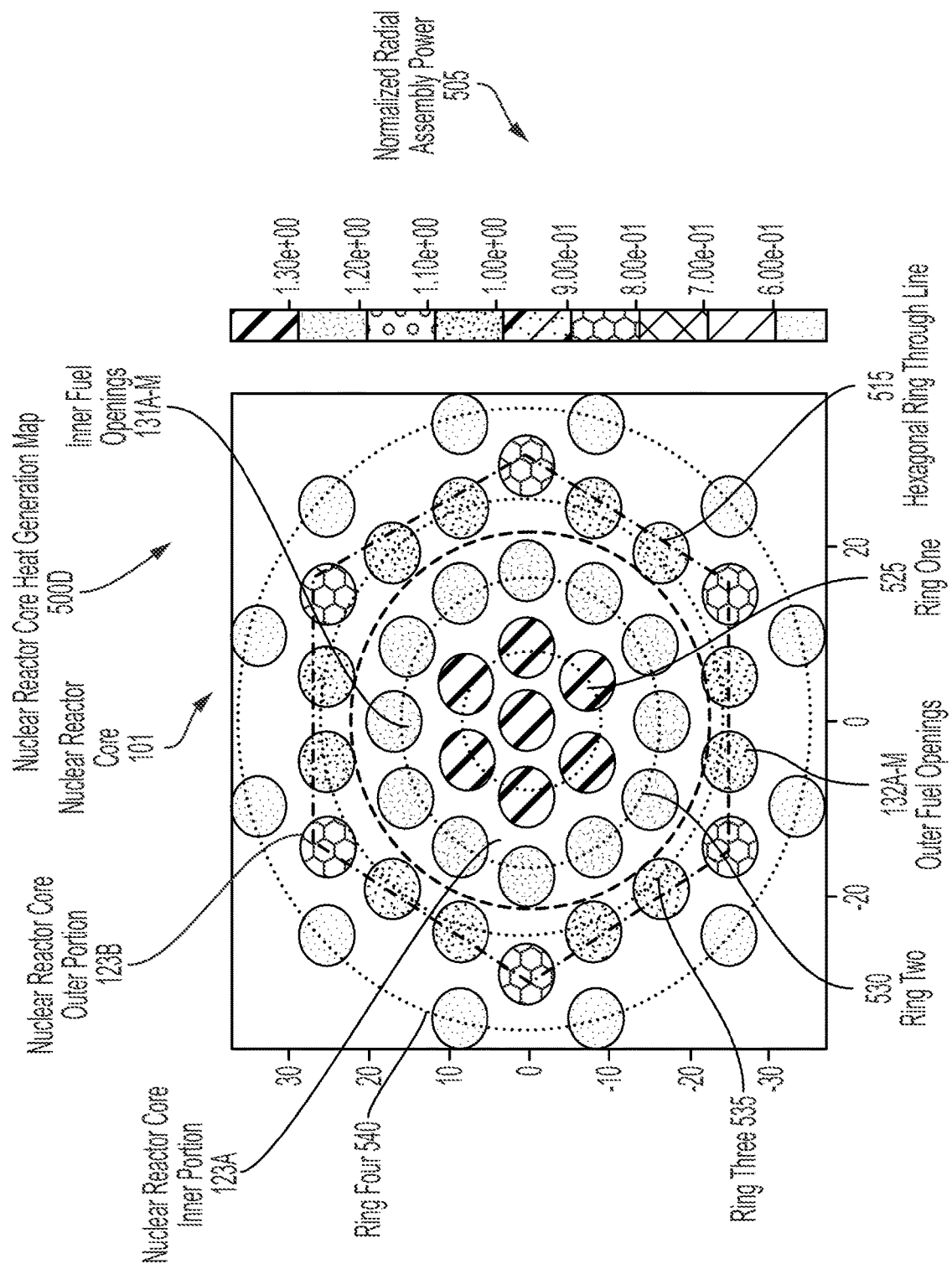

FIG. 5D shows a nuclear reactor core heat generation map 500D of different portions of a nuclear reactor core 101, which utilizes the improvements described in the prior FIGS. 4A-D, in a similar manner as FIG. 5B. FIG. 5D shows the nuclear reactor core 101 where a subset or all of the inner fuel openings 131B-M are arranged as a polygon shape, such as ring one 525 or ring two 530, in the nuclear reactor core inner portion 113A. Here, ring one 525 is a hexagon shape and ring two 530 is a circle shape.

However, the nuclear reactor core heat generation map 500D does not implement a circular ring through line 510, but rather implements a conventional hexagonal ring through line 515. Nuclear reactor core heat generation map 500D depicts a more uniform normalized radial assembly power 505 compared to the nuclear reactor core heat generation map 500C due to decreased spacing between the inner fuel openings 131A-M of the nuclear reactor core inner portion 113. The uniformity of the of the nuclear reactor core heat generation map 500D is also due to the decreased spacing between the outer fuel openings 132A-M of the nuclear reactor core outer portion 113B; and increased spacing between the inner fuel openings 131A-M and outer fuel openings 132A-M.

However, because FIG. 5D implements the conventional hexagonal ring through line 515 rather than a circular ring through line 510, the nuclear reactor core of FIG. 5D has higher power peaking 405 at the nuclear reactor core radial center 156 compared to the nuclear reactor core 101 of FIG. 5B. Hence, the performance of the nuclear reactor core of FIG. 5D has a power peaking factor in between FIGS. 5B and 5C.

To summarize, the nuclear reactor core 101 of FIG. 5B implements the skewed-pin moderator block array 113 described herein and achieves the lowest power peaking factor. FIG. 5C implements a conventional nuclear reactor core and has the highest power peaking factor. FIGS. 5A and 5D implement a hybrid design of a skewed-pin moderator block array 113 and achieve an intermediate power peaking factor that is between FIGS. 5B and 5C with different performance tradeoffs. FIG. 5A shows a relatively cold center inner fuel opening 131A near the nuclear reactor core radial center 157. FIG. 5D shows a uniform temperature, but is less hot towards the nuclear reactor core radial periphery 157.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," "has," "having," "with," "formed of," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A nuclear reactor core, comprising:
   a plurality of fuel elements; and
   one or more moderator blocks to form a nuclear reactor core inner portion and a nuclear reactor core outer portion, wherein:
   the nuclear reactor core inner portion includes an inner moderator matrix formed of a plurality of inner holes that include:
     a plurality of inner fuel openings with one or more of the fuel elements disposed therein, and
     a plurality of inner coolant passages to flow a coolant;
   the nuclear reactor core outer portion includes an outer moderator matrix formed of a plurality of outer holes that include:
     a plurality of outer fuel openings with one or more of the fuel elements disposed therein, and
     a plurality of outer coolant passages to flow the coolant;
   each of the inner coolant passages has an inner coolant passage diameter;
   each of the outer coolant passages has an outer coolant passage diameter;
   the outer coolant passage diameter exceeds the inner coolant passage diameter; and
   each of the inner coolant passages are located closer to a nuclear reactor core radial center than each of the outer coolant passages.

2. The nuclear reactor core of claim 1, wherein:
   an inner pattern of the inner holes is clustered more closely together compared to an outer pattern of the outer holes.

3. The nuclear reactor core of claim 2, wherein
the inner fuel openings of the inner moderator matrix are clustered more closely together compared to the outer fuel openings of the outer moderator matrix; and
the inner coolant passages of the inner moderator matrix are clustered more closely together compared to the outer coolant passages of the outer moderator matrix.

4. The nuclear reactor core of claim 2, wherein:
the inner moderator matrix and the outer moderator matrix collectively form a moderator web.

5. The nuclear reactor core of claim 4, wherein:
the moderator web includes a non-uniform clustering such that the inner moderator matrix includes a tighter clustering of the inner holes compared to the outer holes of the outer moderator matrix.

6. The nuclear reactor core of claim 1, wherein:
each of the inner fuel openings has an inner fuel opening diameter;
each of the outer fuel openings has an outer fuel opening diameter; and
the inner fuel opening diameter exceeds the outer fuel opening diameter.

* * * * *